United States Patent
Richardson, Jr.

(10) Patent No.: US 9,620,947 B2
(45) Date of Patent: Apr. 11, 2017

(54) ANTIGALLOPING DEVICE

(71) Applicant: Albert S. Richardson, Jr., Lexington, MA (US)

(72) Inventor: Albert S. Richardson, Jr., Lexington, MA (US)

(*) Notice: Subject to any disclaimer, the term of this patent is extended or adjusted under 35 U.S.C. 154(b) by 346 days.

(21) Appl. No.: 14/191,990

(22) Filed: Feb. 27, 2014

(65) Prior Publication Data

US 2014/0311765 A1  Oct. 23, 2014

Related U.S. Application Data

(63) Continuation-in-part of application No. 13/926,401, filed on Jun. 25, 2013, now abandoned, and a
(Continued)

(51) Int. Cl.
*H02G 7/12* (2006.01)
*H02G 7/20* (2006.01)
(Continued)

(52) U.S. Cl.
CPC ............... *H02G 7/14* (2013.01); *H02G 1/04* (2013.01)

(58) Field of Classification Search
CPC .. H02G 1/02; H02G 7/00; H02G 7/02; H02G 7/04; H02G 7/05; H02G 7/053;
(Continued)

(56) References Cited

U.S. PATENT DOCUMENTS 1,616,931 A * 2/1927 Thomas .................. E04H 12/10
174/45 R 2,964,101 A  11/1954 Shuhart
(Continued)

FOREIGN PATENT DOCUMENTS

EP  0023952 A1  2/1981
JP  1008814 A  1/1989
(Continued)

OTHER PUBLICATIONS

Definition of "anchor" from www.merriam-webster.com, Mar. 1, 2016.*
(Continued)

*Primary Examiner* — Chau N Nguyen
*Assistant Examiner* — Roshn Varghese
(74) *Attorney, Agent, or Firm* — Hamilton, Brook, Smith & Reynolds, P.C.

(57) ABSTRACT

An antigalloping device can include first and second clamps, each having a respective jaw for clamping to respective first and second cables. A connecting assembly can be coupled between the first and second clamps. The connecting assembly can include an elongate insulator attached to a flexible tether. The flexible tether is capable of being bent and maneuvered during installation. At least one of the first and second clamps can be rotatably coupled to the connecting assembly. The elongate insulator and the flexible tether can straighten along a longitudinal axis. The at least one of the first and second clamps can be orientatable in a position transverse to the longitudinal axis for being rotatable between the position transverse to the longitudinal axis and a position inline with the longitudinal axis, under opposed tension exerted on the jaws of the first and second clamps, for twisting at least one of the first and second cables for reducing galloping.

10 Claims, 29 Drawing Sheets

Related U.S. Application Data continuation-in-part of application No. 13/739,752, filed on Jan. 11, 2013, now abandoned.

(60) Provisional application No. 61/824,866, filed on May 17, 2013, provisional application No. 61/724,161, filed on Nov. 8, 2012.

(51) Int. Cl.
  *H02G 7/02* (2006.01)
  *H02G 7/18* (2006.01)
  *H02G 7/14* (2006.01)
  *H02G 1/04* (2006.01)

(58) Field of Classification Search
  CPC .. H02G 7/06; H02G 7/08; H02G 7/10; H02G 7/12; H02G 7/125; H02G 7/14; H02G 7/205; H02G 7/22; H02G 7/20
  USPC ....... 174/40 R, 40 TD, 40 CC, 42, 44, 45 R, 174/45 TD, 79, 138 E, 140 R, 141 R, 142, 174/146, 150; 191/40; 52/148, 651.02; 361/117
  See application file for complete search history.

(56) References Cited

U.S. PATENT DOCUMENTS

| | | | |
|---|---|---|---|
| 2,708,686 A | | 5/1955 | Bernard, Jr. et al. |
| 2,736,398 A | * | 2/1956 | Peterson ................. E04H 12/20 174/45 R |
| 3,032,605 A | | 5/1962 | Gerlach et al. |
| 3,048,003 A | * | 8/1962 | Payer ....................... H02G 1/02 174/79 |
| 3,111,553 A | * | 11/1963 | Bethea, Jr. ............. H02G 7/056 174/139 |
| 3,260,789 A | | 7/1966 | Edwards |
| 3,357,694 A | * | 12/1967 | Kidder ..................... H02G 7/14 174/42 |
| 3,388,208 A | | 6/1968 | Yakovelivich |
| 3,582,983 A | | 6/1971 | Claren |
| 3,585,277 A | | 6/1971 | Lewis |
| 3,659,034 A | * | 4/1972 | Rawlins ................. H02G 7/125 174/146 |
| 3,904,811 A | | 9/1975 | Otsuki et al. |
| 3,916,083 A | | 10/1975 | Yakovlev et al. |
| 4,013,826 A | * | 3/1977 | Herzig ..................... H02G 7/20 174/43 |
| 4,583,158 A | * | 4/1986 | Ikekame ............... H01L 25/112 174/42 |
| 4,665,460 A | * | 5/1987 | Schaff ....................... H01T 4/14 174/6 |
| 5,036,162 A | * | 7/1991 | Zajfert ..................... H02G 7/20 174/148 |
| 5,362,920 A | | 11/1994 | Richardson |
| 5,400,207 A | * | 3/1995 | Krause ..................... H01T 1/14 361/117 |
| 5,488,197 A | | 1/1996 | Richardson |
| 5,721,393 A | | 2/1998 | Richardson |
| 6,008,453 A | * | 12/1999 | Richardson, Jr. ...... H02G 7/125 174/146 |
| 6,072,120 A | | 6/2000 | Matsuzaki et al. |
| 7,692,100 B2 | | 4/2010 | Boisclair |
| 7,701,688 B2 | * | 4/2010 | Jeon ....................... H02G 7/056 361/117 |
| 8,199,452 B2 | * | 6/2012 | Kruska .................... H01T 1/14 361/117 |
| 9,136,683 B2 | * | 9/2015 | Hyde ....................... H02G 7/12 |
| 2012/0031646 A1 | | 2/2012 | Richardson |
| 2014/0124233 A1 | | 5/2014 | Richardson, Jr. |
| 2014/0124234 A1 | | 5/2014 | Richardson, Jr. |

FOREIGN PATENT DOCUMENTS

| | | |
|---|---|---|
| JP | 1214209 A | 8/1989 |
| JP | 2074116 A | 3/1990 |
| JP | 2095112 A | 4/1990 |
| JP | 4075413 A | 3/1992 |
| JP | 4244721 A | 9/1992 |

OTHER PUBLICATIONS

Richardson, A.S., "The Role of Negative Feedback in Gallop Control," http://arproducts.org/the role of negative feedback in gallop control.html (Nov. 2012).

Zi, F., et al., "Effect of Interphase Composite Spacer on Transmission Line Galloping Control," *Digital Manufacturing and Automation (ICDMA), 2011 Second International Conference*, pp. 485-488, Aug. 5-7, 2011.

http://wayback.archive.org/web/20090420153812//www.arproducts.org, archived Apr. 20, 2009. Shows a picture (video) of an AR snubber on a guy line for a tower.

* cited by examiner

ANTIGALLOPING DEVICE

RELATED APPLICATIONS

This application is a continuation-in-part of U.S. application Ser. No. 13/926,401, filed Jun. 25, 2013, which claims the benefit of U.S. Provisional Application 61/824,866, filed on May 17, 2013, and is a continuation-in-part of U.S. application Ser. No. 13/739,752, filed on Jan. 11, 2013, which claims the benefit of U.S. Provisional Application No. 61/724,161, filed on Nov. 8, 2012. The entire teachings of the above applications are incorporated herein by reference.

BACKGROUND

A span of electrical transmission conductors between transmission towers can be large, often for example between 700 to 1200 feet, and during winter storms, ice accumulating on the electrical conductors can form aerodynamic lifting or wing shaped structures. As the wind passes over the ice wing shaped structures, the conductors can lift, causing galloping of the conductors up and down, which if not controlled, can cause damage to the conductors and the towers. One prior method of addressing such galloping is to connect an interphase spacer between the phase conductors, which can be individual conductors or can include bundles of conductors. In cases where the interphase spacer is connected between two bundles of conductors, bundle spacer rings or devices are secured to each bundle of conductors, for spacing the conductors in the bundle from each other, and the interphase spacer is connected to and between the bundle rings of the two bundles. Often, the interphase spacer includes two or more rigid elongate insulator rods, which can be connected together with joints. The distance between the conductor phases can often be about 24 to 33 feet apart, so that the insulator rod assembly must have the same length. This can make the interphase spacer expensive, as well as long, heavy and unwieldy to install, for example from a helicopter on high transmission lines.

SUMMARY

The present invention can provide an antigalloping device for securement to lines, cables or conductors, such as phase conductors, that are separated by long distances, where the device is less costly and easier to install than devices in the prior art. The antigalloping device can include first and second clamps, each having a respective jaw for clamping to respective first and second cables. A connecting assembly can be coupled between the first and second clamps. The connecting assembly can include an elongate insulator attached to a length of flexible cable. The length of flexible cable is capable of being bent and maneuvered during installation. At least one of the first and second clamps can be rotatably coupled to the connecting assembly. The elongate insulator and the flexible cable are capable of being straightened along a longitudinal axis. The at least one of the first and second clamps can be orientatable in a position transverse to the longitudinal axis for being rotatable between the position transverse to the longitudinal axis and a position inline with the longitudinal axis, under opposed tension exerted on the jaws of the first and second clamps, for twisting at least one of the first and second cables for reducing galloping.

In particular embodiments, the length of flexible cable is flexibly collapsible under opposed compression. The first and second clamps can be rotatably coupled to opposite ends of the connecting assembly about respective clamp joint axes. The elongate insulator and the flexible cable can be rotatably coupled together about a connecting assembly joint axis. The jaws of the first and second clamps can have respective jaw cavity axes that are parallel to each other. The connecting assembly joint axis and the jaw cavity axes can be parallel to each other. The flexible cable can be flexible steel cable. The first and second clamps can include two clamp halves which can be secured together by a fastener. The elongate insulator can have an elongate insulator rod with a series of sheds secured thereto in spaced apart manner. The antigalloping device can be a first antigalloping device in an antigalloping system on a span of cables. The first antigalloping device can be secured to upper and middle cables at a ⅓ span distance, and the system can further include a second antigalloping device which can be secured to middle and lower cables at a ⅔ span distance, for reducing galloping of the cables.

The present invention can also provide an antigalloping conductor span including upper, middle and lower conductors, each having a span length. A first antigalloping device can be secured to the upper and middle conductors at a ⅓ span distance. A second antigalloping device can be secured to the middle and lower conductors at a ⅔ span distance. The first and second antigalloping devices can each include upper and lower clamps, each having a respective jaw for clamping to respective upper, middle and lower conductors. A connecting assembly can be coupled between the upper and lower clamps. The connecting assembly can include an upper elongate insulator attached to a lower length of flexible cable. The length of flexible cable can be bent and maneuvered during installation. The lower clamp can be rotatably coupled to the connecting assembly at an end of the length of flexible cable. The elongate insulator and the flexible cable are capable of straightening along a longitudinal axis. The lower clamp can be secured to respective middle and lower conductors in an orientation that is transverse to the longitudinal axis. The lower clamp is capable of being rotated between the position transverse to the longitudinal axis and a position inline with the longitudinal axis with opposed tension exerted on the jaws of the upper and lower clamps, for twisting respective middle and lower conductors for reducing galloping of the conductors.

In particular embodiments, the length of flexible cable of the first and second antigalloping devices can be flexibly collapsible under opposed compression. During antigalloping operation, one of the first and second antigalloping devices is capable of being straightened along the longitudinal axis under opposed tension, and substantially at the same time, the length of flexible cable of the other antigalloping device is capable of flexibly collapsing under opposed compression. The upper, middle and lower conductors can be selected conductors in respective upper, middle and lower conductor bundles.

The present invention can also provide a method of reducing galloping in a span of cables including securing an antigalloping device to first and second cables. The antigalloping device can have first and second clamps, each with a respective jaw for clamping to respective first and second cables. A connecting assembly can be coupled between the first and second clamps. The connecting assembly can include an elongate insulator attached to a length of flexible cable. The length of flexible cable can be bent and maneuvered during installation. At least one of the first and second clamps can be rotatably coupled to the connecting assembly. The at least one of the first and second clamps can be oriented in a position transverse to the longitudinal axis. The elongate insulator and the flexible cable can be straightened along a longitudinal axis and the at least one of the first and second clamps rotated between the position transverse to the longitudinal axis and a position inline with the longitudinal axis, under opposed tension exerted on the jaws of the first and second clamps caused by movement of the first and second cables away from each other, for twisting at least one of the first and second cables and reducing galloping.

In particular embodiments, the method can include alternately limiting amount of movement of the first and second cables away from each other when the elongate insulator and the flexible cable are straightened out, and flexibly collapsing the flexible cable under opposed compression caused by movement of the first and second cables towards each other. The first and second clamps can be rotatably coupled to opposite ends of the connecting assembly about respective clamp joint axes. The elongate insulator and the flexible cable can be rotatably coupled together about a connecting assembly joint axis. The jaws of the first and second clamps can be provided with respective jaw cavity axes that are parallel to each other. The clamp joint axes, the connecting assembly joint axis and the jaw cavity axes can be parallel to each other. The flexible cable can be formed from flexible steel cable. The first and second clamps can be provided with two clamp halves which are secured together by a fastener. The elongate insulator can be formed with an elongate insulator rod with a series of sheds secured thereto in spaced apart manner. The antigalloping device can be a first antigalloping device in an antigalloping system on the span of cables. The method further includes securing the first antigalloping device to upper and middle cables at a ⅓ span distance, and securing a second antigalloping device to middle and lower cables at a ⅔ span distance, for reducing galloping of the cables. The upper, middle and lower cables can be positioned in respective upper, middle and lower bundles.

The present invention can also provide a method of reducing galloping in a conductor span having upper, middle and lower conductors. A first antigalloping device can be secured to the upper and middle conductors at a ⅓ span distance. A second antigalloping device can be secured to the middle and lower conductors at a ⅔ span distance. The first and second antigalloping devices can each include upper and lower clamps, each having a respective jaw for clamping to respective upper, middle and lower conductors. A connecting assembly can be coupled between the upper and lower clamps. The connecting assembly can include an upper elongate insulator attached to a lower length of flexible cable. The length of flexible cable can be bent and maneuvered during installation. The lower clamp can be rotatably coupled to the connecting assembly at an end of the length of flexible cable. The lower clamps of the first and second antigalloping devices can be secured to respective middle and lower conductors in an orientation that is transverse to the longitudinal axis. In at least one of the first and second antigalloping devices, the elongate insulator and the flexible cable can be straightened along a longitudinal axis, and the lower clamp rotated, between the position transverse to the longitudinal axis and a position inline with the longitudinal axis with opposed tension exerted on the jaws of the upper and lower clamps caused by movement of associated conductors away from each other, for twisting respective middle and lower conductors for reducing galloping of the conductors.

In particular embodiments, one of the first and second antigalloping devices can be straightened along the longitudinal axis under opposed tension caused by movement of associated conductors away from each other and limiting amount of movement of such conductors away from each other, and substantially at the same time, flexibly collapsing the length of flexible cable of the other antigalloping device under opposed compression caused by movement of associated conductors towards each other. The upper, middle and lower conductors can be positioned in respective upper, middle and lower conductor bundles.

The present invention can also provide an antigalloping device including first and second clamps, each having a respective jaw for clamping to respective first and second cables. A connecting assembly can be coupled between the first and second clamps. The connecting assembly can include an elongate insulator attached to a flexible tether. The flexible tether is capable of being bent and maneuvered during installation. At least one of the first and second clamps can be rotatably coupled to the connecting assembly. The elongate insulator and the flexible tether are capable of being straightened along a longitudinal axis. The at least one of the first and second clamps can be orientatable in a position transverse to the longitudinal axis for being rotatable between the position transverse to the longitudinal axis and a position inline with the longitudinal axis, under opposed tension exerted on the jaws of the first and second clamps, for twisting at least one of the first and second cables for reducing galloping.

In particular embodiments, the flexible tether can be a length of flexible cable that can be flexibly collapsible under opposed compression. The flexible cable can be flexible steel cable. The first and second clamps can be rotatably coupled to opposite ends of the connecting assembly about respective clamp joint axes. The elongate insulator and the flexible cable can be rotatably coupled together about a connecting assembly joint axis. The connecting assembly can be coupled in a generally lateral orientation between laterally spaced first and second cables.

In one embodiment, the length of flexible cable can be a first length of flexible cable, and the connecting assembly joint axis can be a first connecting assembly joint axis. The connecting assembly can further include a second length of flexible cable. The first and second lengths of flexible cable can be rotatably coupled to opposite ends of the elongate insulator by the first connecting assembly joint axis and by a second connecting assembly joint axis, respectively. The first and second clamps can be rotatably coupled to respective terminal ends of the first and second lengths of flexible cable. The connecting assembly can be coupled in a generally lateral orientation between laterally spaced first and second cables.

In another embodiment, the elongate insulator can be a first elongate insulator, and the connecting assembly joint axis can be a first connecting assembly joint axis. The connecting assembly can further include a second elongate insulator. The first and second elongate insulators can be rotatably coupled to opposite ends of the length of flexible cable by the first connecting assembly joint axis and by a second connecting assembly joint axis, respectively. The first and second clamps can be rotatably coupled to respective terminal ends of the first and second elongate insulators. The connecting assembly can be coupled in a generally lateral orientation between laterally spaced first and second cables.

In some embodiments, the antigalloping device can be a first antigalloping device in an antigalloping system on a span of cables having the first and second cables, and a third cable. The first antigalloping device can be secured to two of the first, second and third conductors at a ⅓ span distance.

The system can further include a second antigalloping device for being secured to one of the two cables, and to another of the first, second and third cables not previously secured to, at a ⅔ span distance, for reducing galloping of the cables.

In other embodiments, the antigalloping device can be part of an antigalloping system on a span of cables and secured to the first and second cables at a ⅓ span distance. The span of cables can include a third cable. A first spacer device can include first and second spacer clamps rotatably coupled or connected to opposite ends of a first rigid spacer rod or member, and can be included in the antigalloping system. The clamps of the first spacer device can be clamped to the first cable and to the third cable, at a ½ span distance for reducing galloping of the cables. The antigalloping device can twist the first cable at the ⅓ span distance during galloping, and twisting of the first cable can cause the first spacer device to twist the third cable at the ½ span distance.

In addition, the span of cables can include first and second twin bundles laterally spaced apart from each other. The first twin bundle can include the first and third cables laterally spaced apart from each other, and the second twin bundle can include the second cable and a fourth cable laterally spaced apart from each other. The antigalloping device can be coupled in a generally lateral orientation between the first cable of the first twin bundle and the second cable of the second twin bundle. The antigalloping system can further include a second spacer device having third and fourth spacer clamps rotatably coupled or connected to opposite ends of a second rigid spacer rod or member. The clamps of the second spacer device can be clamped to the second and fourth cables of the second twin bundle at the ½ span distance. The first and second spacer devices can be coupled in a generally lateral orientation. The antigalloping device can twist the first and second cables at the ⅓ span distance during galloping, which can cause the first and second spacer devices to twist respective third and fourth cables of the first and second twin bundles at the ½ span distance.

The present invention can also provide an antigalloping conductor span including first, second and third conductors, each having a span length. A first antigalloping device can be secured to two of the first, second and third conductors at a ⅓ span distance. A second antigalloping device can be secured to one of said two conductors and to another of the first, second and third conductors not previously secured to, at a ⅔ span distance. The first and second antigalloping devices can each include first and second clamps, each having a respective jaw for clamping to respective first, second and third conductors. A connecting assembly can be coupled between the first and second clamps. The connecting assembly can include an elongate insulator attached to a flexible tether. The flexible tether can be bent and maneuvered during installation. At least one of the first and second clamps can be rotatably coupled to the connecting assembly. The elongate insulator and the flexible tether are capable of straightening along a longitudinal axis, and the at least one of the first and second clamps can be orientable in a position transverse to the longitudinal axis, for rotating between the position transverse to the longitudinal axis and a position inline with the longitudinal axis with opposed tension exerted on the jaws of the first and second clamps, for twisting respective conductors for reducing galloping of the conductors.

In particular embodiments, the flexible tether of the first and second antigalloping devices can be flexibly collapsible under opposed compression. During antigalloping operation, one of the first and second antigalloping devices is capable of being straightened along the longitudinal axis under opposed tension, and substantially at the same time, the flexible tether of the other antigalloping device is capable of flexibly collapsing under opposed compression. The first, second and third conductors can be selected conductors in respective first, second and third conductor bundles.

The present invention can also provide a method of reducing galloping in a span of cables including securing an antigalloping device to first and second cables. The antigalloping device can have first and second clamps, each with a respective jaw for clamping to respective first and second cables. A connecting assembly can be coupled between the first and second clamps. The connecting assembly can include an elongate insulator attached to a flexible tether. The flexible tether can be bent and maneuvered during installation. At least one of the first and second clamps can be rotatably coupled to the connecting assembly. The at least one of the first and second clamps can be oriented in a position transverse to a longitudinal axis. The elongate insulator and the flexible tether can be straightened along the longitudinal axis and the at least one of the first and second clamps rotated between the position transverse to the longitudinal axis and a position inline with the longitudinal axis, under opposed tension exerted on the jaws of the first and second clamps caused by movement of the first and second cables away from each other, for twisting at least one of the first and second cables and reducing galloping.

In particular embodiments, the flexible tether can be a length of flexible cable. The method can include alternately limiting amount of movement of the first and second cables away from each other when the elongate insulator and the flexible cable are straightened out, and flexibly collapsing the flexible cable under opposed compression caused by movement of the first and second cables towards each other. The flexible cable can be flexible steel cable. The first and second clamps can be rotatably coupled to opposite ends of the connecting assembly about respective clamp joint axes. The elongate insulator and the flexible cable can be rotatably coupled together about a connecting assembly joint axis. The connecting assembly can be coupled in a generally lateral orientation between laterally spaced first and second cables.

In one embodiment, the length of flexible cable can be a first length of flexible cable, and the connecting assembly joint axis can be a first connecting assembly joint axis. The connecting assembly can be provided with a second length of flexible cable. The first and second lengths of flexible cable can be rotatably coupled to opposite ends of the elongate insulator by the first connecting assembly joint axis and by a second connecting assembly joint axis, respectively. The first and second clamps can be rotatably coupled to respective terminal ends of the first and second lengths of flexible cable. The connecting assembly can be coupled in a generally lateral orientation between laterally spaced first and second cables.

In another embodiment, the elongate insulator can be a first elongate insulator, and the connecting assembly joint axis can be a first connecting assembly joint axis. The connecting assembly can be provided with a second elongate insulator. The first and second elongate insulators can be rotatably coupled to opposite ends of the length of flexible cable by the first connecting assembly joint axis and by a second connecting assembly joint axis, respectively. The first and second clamps can be rotatably coupled to respective terminal ends of the first and second elongate insulators.

The connecting assembly can be coupled in a generally lateral orientation between laterally spaced first and second cables.

In some embodiments, the antigalloping device can be a first antigalloping device in an antigalloping system on a span of cables having the first and second cables, and a third cable. The first antigalloping device can be secured to two of the first, second and third conductors at a ⅓ span distance. A second antigalloping device can be secured to one of the two cables, and to another of the first, second and third cables not previously secured to, at a ⅔ span distance, for reducing galloping of the cables.

In other embodiments, the antigalloping device can be part of an antigalloping system on a span of cables, and the span of cables can include a third cable. The antigalloping device can be secured to the first and second cables at a ⅓ span distance. The antigalloping system can be provided with a first spacer device including first and second spacer clamps rotatably coupled or connected to opposite ends of a first rigid spacer rod or member. The clamps of the first spacer device can be clamped to the first cable and to the third cable, at a ½ span distance for reducing galloping of the cables. The antigalloping device can cause twisting of the first cable at the ⅓ span distance during galloping, thereby causing the first spacer device to twist the third cable at the ½ span distance.

In addition, the span of cables can include first and second twin bundles laterally spaced apart from each other. The first twin bundle can include the first and third cables laterally spaced apart from each other, and the second twin bundle can include the second cable and a fourth cable laterally spaced apart from each other. The antigalloping device can be coupled in a generally lateral orientation between the first cable of the first twin bundle and the second cable of the second twin bundle. The antigalloping system can be provided with a second spacer device having third and fourth spacer clamps rotatably coupled or connected to opposite ends of a second rigid spacer rod or member. The clamps of the second spacer device can be clamped to the second and fourth cables of the second twin bundle at the ½ span distance. The first and second spacer devices can be coupled in a generally lateral orientation. Twisting of the first and second cables at the ⅓ span distance by the antigalloping device during galloping, can cause the first and second spacer devices to twist respective third and fourth cables of the first and second twin bundles at the ½ span distance.

The present invention can also provide a method of reducing galloping in a conductor span having first, second and third conductors. A first antigalloping device can be secured to two of the first, second and third conductors at a ⅓ span distance. A second antigalloping device can be secured one of the two conductors, and to another of the first, second and third conductors not previously secured to, at a ⅔ span distance. The first and second antigalloping devices can each include first and second clamps, each having a respective jaw for clamping to respective first, second and third conductors. A connecting assembly can be coupled between the first and second clamps. The connecting assembly can include an elongate insulator attached to a flexible tether. The flexible tether can be bent and maneuvered during installation. At least one of the first and second clamps can be rotatably coupled to the connecting assembly. The at least one of the first and second clamps of the first and second antigalloping devices can be secured to respective conductors in an orientation that is transverse to a longitudinal axis. In at least one of the first and second antigalloping devices, the elongate insulator and the flexible tether can be straightened along the longitudinal axis, and the at least one of the first and second clamps rotated, between the position transverse to the longitudinal axis and a position inline with the longitudinal axis with opposed tension exerted on the jaws of the first and second clamps caused by movement of associated conductors away from each other, for twisting respective conductors for reducing galloping of the conductors.

In particular embodiments, one of the first and second antigalloping devices can be straightened along the longitudinal axis under opposed tension caused by movement of associated conductors away from each other and limiting amount of movement of such conductors away from each other, and substantially at the same time, flexibly collapsing the flexible tether of the other antigalloping device under opposed compression caused by movement of associated conductors towards each other. The first, second and third conductors can be positioned in respective first, second and third conductor bundles.

The present invention can also provide an antigalloping device including first and second securement fittings for securing to two spaced apart locations. The first securement fitting can include a clamp having a jaw for clamping to a generally laterally extending electrical conductor. A connecting assembly can be coupled between the first and second securement fittings. The connecting assembly can include an elongate insulator attached to a flexible tether. The flexible tether can be capable of being bent and maneuvered during installation. The clamp can be rotatably coupled to the connecting assembly. The elongate insulator and the flexible tether can be capable of straightening along a longitudinal axis. The clamp can be orientatable in a position transverse to the longitudinal axis for being rotatable between the position transverse to longitudinal axis and a position inline with the longitudinal axis, under opposed tension exerted on the first and second securement fittings for twisting the electrical conductor for reducing galloping.

In particular embodiments, an anchor member can be included to which the second securement fitting can be secured for securing and electrically grounding the antigalloping device to the ground. The second securement fitting can include a ring member for securing to the anchor member. The flexible tether can include a length of flexible cable and can be flexible steel cable. The clamp can be rotatably coupled to the connecting assembly about a clamp joint axis. The elongate insulator and the flexible cable can be rotatably coupled together about a connecting assembly joint axis. The antigalloping device can be a first antigalloping device in an antigalloping system on a span of generally laterally extending electrical conductors having upper, middle and lower electrical conductors. The first antigalloping device can be secured to one of the middle and lower conductors at a ⅓ span distance. The system can further include a second antigalloping device for being secured to the other of the middle and lower conductors at a ⅔ span distance, for reducing galloping of the span of conductors. The upper, middle and lower electrical conductors can each be a bundle of at least two electrical conductors. The first and second antigalloping devices can each be secured to one of the conductors in respective bundles of the middle and lower conductors. The span of electrical conductors can include a first circuit having bundles of upper, middle and lower electrical conductors, and a second circuit laterally spaced apart from the first circuit having bundles of upper, middle and lower electrical conductors. The first antigalloping device can have twin antigalloping units secured to at least one anchor member and to one conductor in respective bundles in both the first and second circuits at the ⅓ span distance. The second antigalloping device can have twin antigalloping units secured to the at least one anchor member and to one conductor in respective bundles in both the first and second circuits at the ⅔ span distance.

The present invention can also provide an antigalloping electrical conductor span including at least one generally laterally extending electrical conductor. An antigalloping system can be included and can have at least one antigalloping device. The at least one antigalloping device can include a connecting assembly having an electrically insulated portion and a flexible tether. The flexible tether can be capable of being bent and maneuvered during installation. A clamp can be rotatably coupled to a first end of the connecting assembly and have a jaw clamping to the at least one electrical conductor. A securement fitting extending from the second end of the connecting assembly can be secured to an anchor member that is secured and electrically grounded to ground for anchoring the second end of the connecting assembly to the ground. The connecting assembly is capable of straightening along a longitudinal axis under tension. The clamp can be orientatable in a position transverse to the longitudinal axis for being rotatable between the position transverse to the longitudinal axis and a position inline with the longitudinal axis under up/down movement of the at least one electrical conductor, for twisting the at least one electrical conductor for reducing galloping.

In particular embodiments, the at least one electrical conductor can include a span of upper, middle and lower generally laterally extending electrical conductors. The at least one antigalloping device can include a first antigalloping device secured to one of the middle and lower conductors at a ⅓ span distance. The system can further include a second antigalloping device secured to the other of the middle and lower conductors at a ⅔ span distance, for reducing galloping in the span of conductors. The upper, middle and lower electrical conductors can each be a bundle of at least two electrical conductors. The first and second antigalloping devices can each be secured to one of the conductors in respective bundles of the middle and lower conductors. The span of electrical conductors can include a first circuit having bundles of upper, middle and lower electrical conductors, and a second circuit laterally spaced apart from the first circuit having bundles of upper, middle and lower electrical conductors. The first antigalloping device can have twin antigalloping units secured to at least one anchor member and to one conductor in respective bundles in both the first and second circuits at the ⅓ span distance. The second antigalloping device can have twin antigalloping units secured to the at least one anchor member and to one conductor in respective bundles in both the first and second circuits at the ⅔ span distance.

The present invention can also provide a method of reducing galloping in an electrical conductor span including securing an antigalloping device to a generally laterally extending electrical conductor. The antigalloping device can have first and second securement fittings for securing to two spaced apart locations. The first securement fitting can include a clamp having a jaw for clamping to the electrical conductor. A connecting assembly can be coupled between the first and second securement fittings. The connecting assembly can include a elongate insulator attached to a flexible tether. The flexible tether is capable of being bent and maneuvered during installation. The clamp can be rotatably coupled to the connecting assembly. The clamp can be orientated in position transverse to a longitudinal axis of the connecting assembly. The elongate insulator and the flexible tether can be straightened along the longitudinal axis and rotated between the position transverse to the longitudinal axis and a position inline with the longitudinal axis, under opposed tension exerted on the first and second securement fittings caused by movement of the electrical conductor for twisting the electrical conductor and reducing galloping.

In particular embodiments, the second securement fitting can be secured to an anchor member for securing and electrically grounding the antigalloping device to ground. A ring member can be provided as the second securement fitting for securing to the anchor member. A length of flexible cable can be provided as the flexible tether and can be flexible steel cable. The clamp can be rotatably coupled to the connecting assembly about a clamp joint axis. The elongate insulator and the flexible cable can be rotatably coupled together about a connecting assembly joint axis. The antigalloping device can be a first antigalloping device in an antigalloping system on a span of generally laterally extending electrical conductors having upper, middle and lower electrical conductors. The first antigalloping device can be secured to one of the middle and lower conductors at a ⅓ span distance. A second antigalloping device of the system can be secured to the other of the middle and lower conductors at a ⅔ span distance, for reducing galloping of the span of conductors. The upper, middle and lower electrical conductors can each be a bundle of at least two electrical conductors. The first and second antigalloping devices can be secured to one of the conductors in respective bundles of the middle and lower conductors. The span of electrical conductors can include a first circuit having bundles of upper, middle and lower electrical conductors, and a second circuit laterally spaced apart from the first circuit having bundles of upper, middle and lower electrical conductors. The first antigalloping device can be configured with twin antigalloping units secured to at least one anchor member and to one conductor in respective bundles in both the first and second circuits at the ⅓ span distance. The second antigalloping device can be configured with twin antigalloping units secured to the at least one anchor member and to one conductor in respective bundles in both the first and second circuits at the ⅔ span distance.

The present invention can also provide a method of reducing galloping in a span of at least one generally laterally extending electrical conductor. At least one antigalloping device of an antigalloping system can be secured to the at least one electrical conductor. The at least one antigalloping device can include a connecting assembly having an electrically insulated portion and a flexible tether. The flexible tether can be capable of being bent and maneuvered during installation. A clamp can be rotatably coupled to a first end of the connecting assembly and have a jaw clamped to the at least one electrical conductor. A securement fitting can extend from the second end of the connecting assembly and secure the second end of the connecting assembly to an anchor member that is secured and electrically grounded to ground. The clamp can be oriented in a position transverse to a longitudinal axis of the connecting assembly. The connecting assembly can be straightened along the longitudinal axis and the clamp can be rotated between the position transverse to the longitudinal axis and a position inline with the longitudinal axis under up/down movement of the at least one electrical conductor, for twisting the at least one electrical conductor for reducing galloping.

In particular embodiments, the at least one electrical conductor can include a span of upper, middle and lower generally laterally extending electrical conductors. The at least one antigalloping device can include a first antigalloping device. The first antigalloping device can be secured to one of the middle and lower conductors at a ⅓ span distance. A second antigalloping device of the system can be secured to the other of the middle and lower conductors at a ⅔ band distance, for reducing galloping in the span of conductors. The upper, middle and lower electrical conductors can each be a bundle of at least two electrical conductors. The first and second antigalloping devices can be secured to one of the conductors in respective bundles of the middle and lower conductors. The span of electrical conductors can each include a first circuit having bundles of upper, middle and lower electrical conductors, and a second circuit laterally spaced apart from the first circuit having bundles of upper, middle and lower electrical conductors. The first antigalloping device can be configured with twin antigalloping units secured to at least one anchor member and to one conductor in respective bundles in both the first and second circuits at the ⅓ span distance. The second antigalloping device can be configured with twin antigalloping units secured to the at least one anchor member and to one conductor in respective bundles in both the first and second circuits at the ⅔ span distance.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
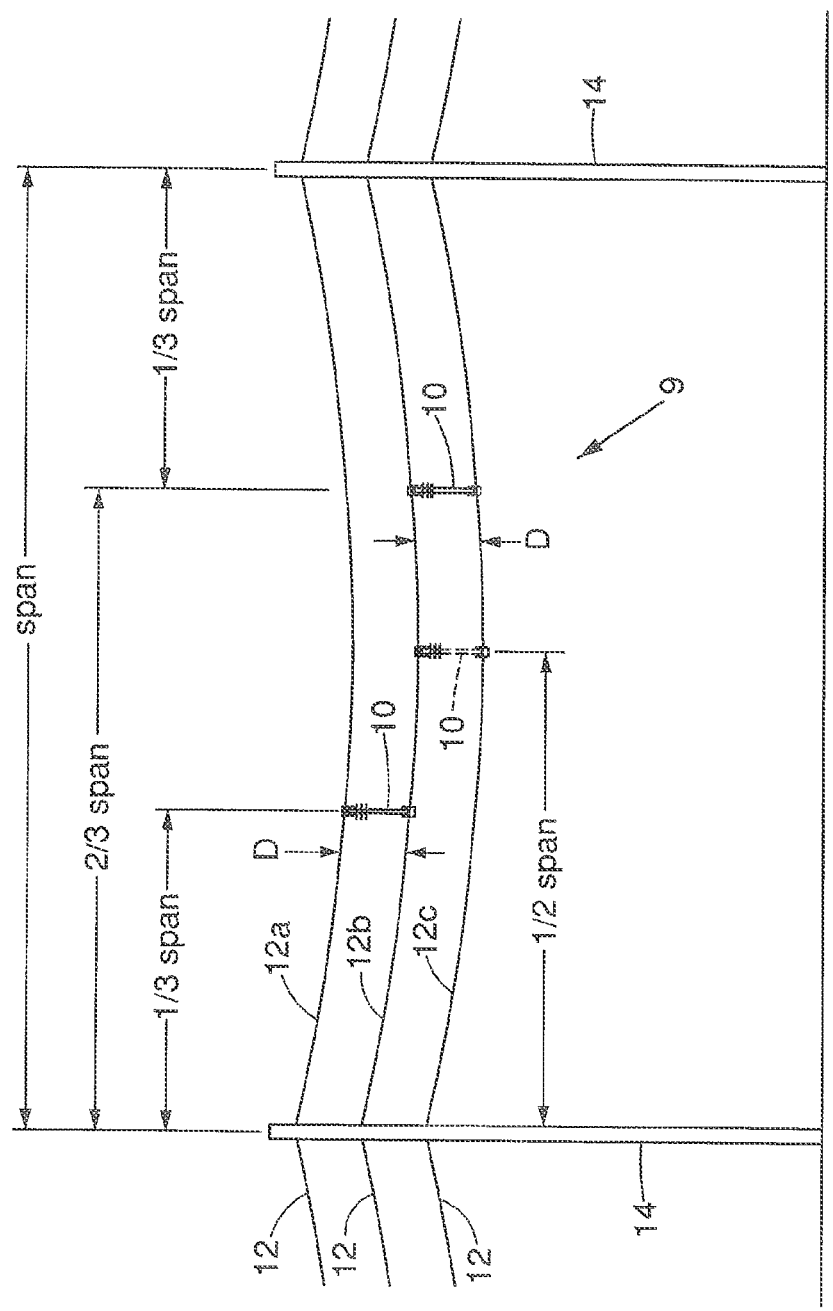
FIG. 1 is a schematic front view of an antigalloping system or antigalloping span in the present invention.

Referring to FIG. 1, a span of electrical transmission phases, lines, cables or conductors 12, between two transmission poles or towers 14, can be for example, about 700 to 1200 feet long and the distance D between phase conductors 12 can be, for example, about 24 to 33 feet. These dimensions can be greater or less, depending upon the situation at hand. For a typical span of around 700 to 1200 feet long, an antigalloping system 9 or antigalloping conductor span in the present invention can include two antigalloping, spacer, or cable twister devices, units or apparatuses 10, for preventing, limiting or reducing galloping of the conductors 12. A first, top or upper antigalloping device 10 can be coupled, connected or secured at the ⅓ span location to and between the first, top or upper phase, line, cable or conductor 12a and the second, intermediate or middle phase, line cable or conductor 12b, and a second, bottom or lower antigalloping device 10 can be coupled, connected or secured at the ⅔ span location to and between the second or middle conductor 12b and the third, bottom or lower phase, line, cable or conductor 12c.

Figure 2:
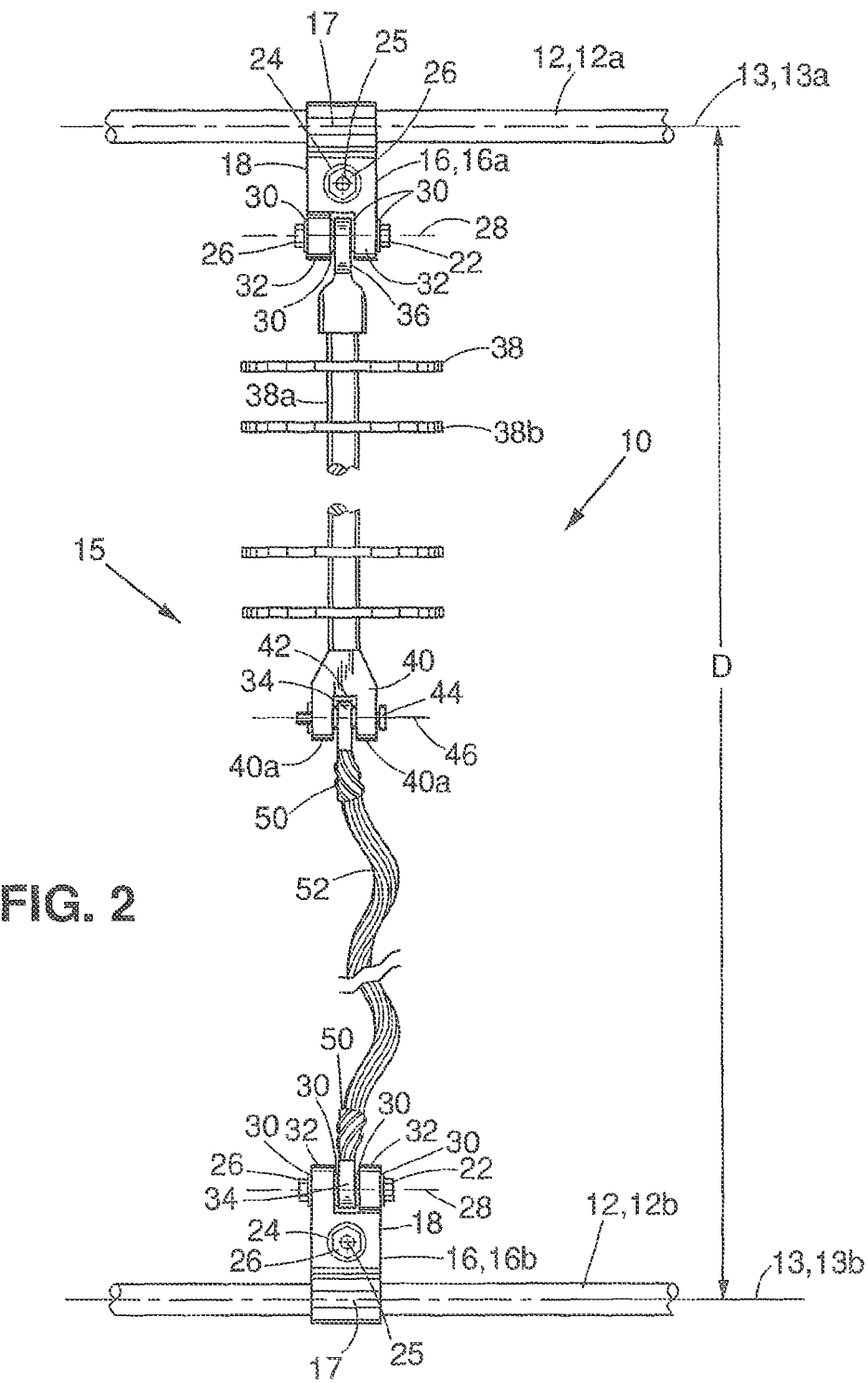
FIG. 2 is a front view of the an embodiment of an antigalloping device in the present invention.
Figure 3:
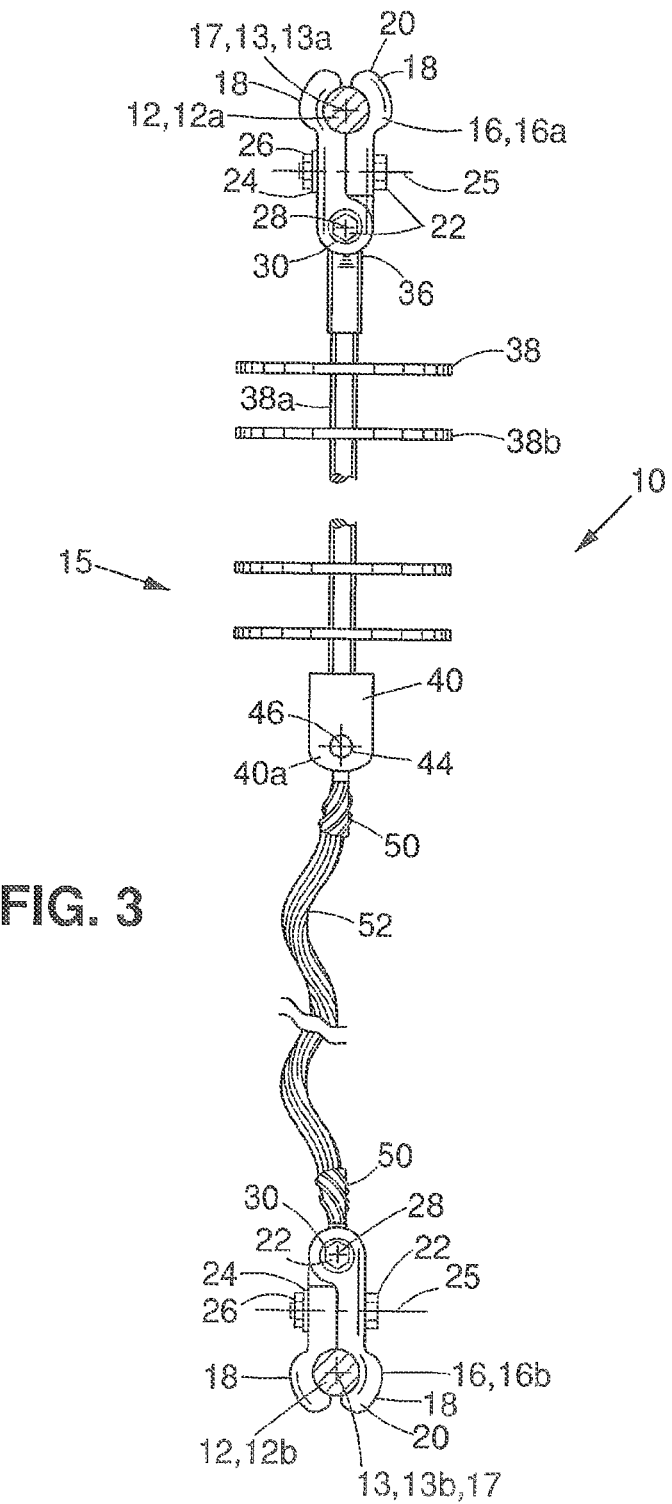
FIG. 3 is a side view of the antigalloping device of FIG. 2.

Referring to FIGS. 2 and 3, each antigalloping device 10 can include two clamps 16 with jaws 20 for securement to the conductors 12. The following provides some description for securement in relation to the upper 12a and middle conductors 12b, and it is understood that securement relative to the middle 12b and lower 12c conductors is similar. The first, top or upper clamp 16a can be secured to and clamp the upper conductor 12a in fixed relationship thereto, and the second or lower clamp 16b can be secured to and clamp the middle conductor 12b in fixed relationship thereto. Each clamp 16 can include two opposed clamp halves 18 which can be secured or tightened together by a fastener arrangement, such as bolt 22, washer 24 and nut 26, extending through the clamp halves 18 along a tightening axis 25 that is perpendicular or transverse to the jaw cavity axis 17 of the jaws 20 and the longitudinal axes 13 of conductors 12.

An elongate partially flexible restraining or connecting member or assembly 15 can be coupled or connected between the two clamps 16. The clamps 16 can be pivotally or rotatably coupled or connected to opposite ends of the connecting assembly 15 about clamp joint axes 28, where a tongue or pivot member or fitting 36 or 34 at the opposite ends of the connecting assembly 15 can be rotatably secured in the space or gap between two ears or extensions 32 of the clamp halves 18 of each clamp 16, by a bolt, 22, washers 30 and nut 26 positioned along axes 28. The washers 30 can be positioned between the tongues 34 and 36, ears 32, bolt 22 and nut 26. The washers 30 can be loose, and can damp Aeolian vibration. The axes 28 can be parallel to the longitudinal axes 13 of the conductors 12, such as axis 13a of conductor 12a and axis 13b of conductor 12b.

The connecting assembly 15 can be electrically insulative and can include an elongate rigid electrical insulator 38 being at an upper portion, attached to a length of flexible cable 52, such as steel cable, being at a lower portion, which can be generally nonstretchable once straightened out. The insulator 38 can include a rigid elongate insulator rod 38a extending along a longitudinal axis X, and a series of sheds 38b spaced apart thereon. Tongue 36 can be at one end of rod 38a, such as an upper end, and a clevis joint member or fitting 40 can be at the other or opposite end, such as a lower end. The tongue 36 can be pivotally or rotatably coupled or connected to upper clamp 16a about axis 28 as described above. The cable 52 can be galvanized steel aircraft cable, and often can be 3/16 to 3/8 inches in diameter. The cable 52 can be rotatably coupled or connected to the insulator 38 at the clevis fitting 40. The cable 52 can be secured to a pivot member 34, such as a spool, by a helical grip 50 at each opposite end of the cable. One pivot member 34 secured to a first or upper end of cable 52 can be pivotally or rotatably coupled or connected to the clevis fitting 40 in the space or gap between two ears or extensions 40a, by a pin or rod 44 along a connecting assembly clevis joint axis 46. Axis 46 can be parallel to axes 28, axis 17, and the axes 13 of the conductors 12, axes 13a and 13b. Washers 30 can be positioned between these mating components. The other pivot member 34 secured at the opposite, second or lower end of cable 52 can be pivotally or rotatably coupled or connected to lower clamp 16b about axis 28 as described above.

As seen in FIGS. 2 and 3, typically the antigalloping device 10 is positioned so that the insulator 38 is above the cable 52, and the cable 52 hangs downwardly. The flexible cable 52 is flexibly bendable which allows the cable 52 to be bent or coiled in a compact manner such as for storage, and then uncoiled, bent and maneuvered from a hanging orientation or configuration into position for easy installation. In order to allow such bending and maneuvering, other than possible coatings or protective jacketing on the cable 52, there are no supporting, stiffening or reinforcing members, springs, tubes or rods, added to the cable 52 to substantially stiffen or support the cable 52, to keep it straight or make it rigid. As a result, the cable 52 is flexibly collapsible when bent, or when opposed compression forces in the direction of arrows 54 (FIG. 5) are exerted on or from the jaws 20 of clamps 16 to the connecting assembly 15, caused by conductors 12 moving towards each other in the direction of arrows 54. The insulator 38 can be one that is commercially available, and can be in some embodiments, about 12 feet long, so that for distances D between conductors 12 ranging from about 24 to 33 feet, the length of flexible cable 52 can be about 12 to 21 feet long. The length of cable 52 can be varied to adjust to different distances between the conductors 12.

Figure 4:
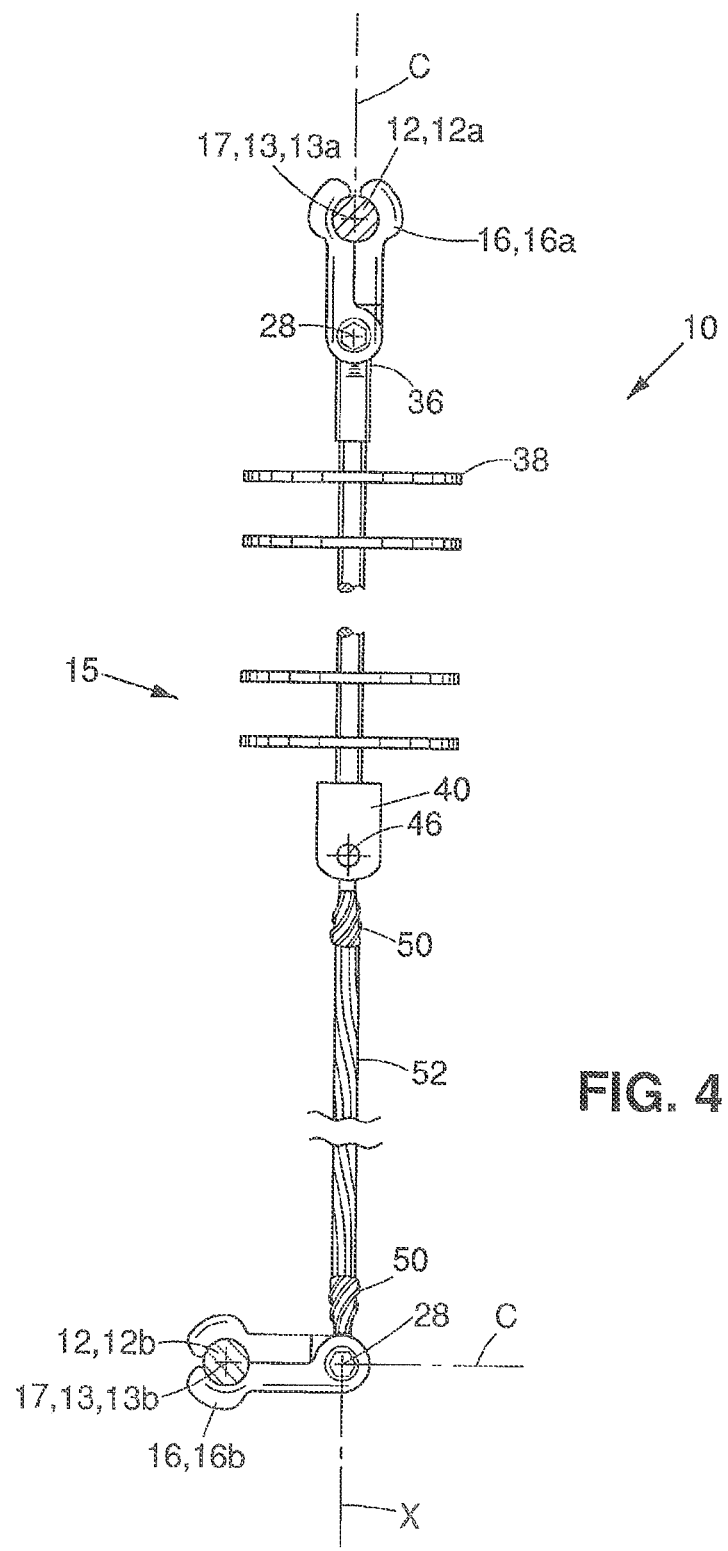
FIG. 4 is a side view of the antigalloping device shown in FIG. 3 with the flexible cable straightened out and the lower clamp secured to a conductor in a horizontal orientation.

Referring to FIGS. 1 and 4, when installing the antigalloping devices 10 in a typical conductor span between about 700 to 1200 feet, the first device 10 can be first secured to upper conductor 12a at the ⅓ span distance by securing or clamping the upper or top clamp 16a to the upper conductor 12a by tightening bolt 22 along axis 25, so that clamp 16a and its longitudinal axis C is fixed in a substantially vertically downwardly hanging orientation generally or substantially inline with the longitudinal axis X of the insulator 38 and the hanging straightened connecting assembly 15, that extends or hangs downwardly from clamp 16a. The upper clamp 16a can be installed in place by a worker on a helicopter, or alternately from a trolley. The flexible cable 52 hanging below the insulator 38 of the connecting assembly 15 can be bent and maneuvered easily into position and the lower or bottom clamp 16b connected to the lower end of cable 52 can be secured or clamped to the middle conductor 12b by tightening bolt 22 along axis 25, so that clamp 16b and its longitudinal axis C is fixed in a horizontal orientation that is transverse, perpendicular, 90° or at a right angle to vertical or the longitudinal axis X. The flexible cable 52 can flexibly bend to allow lower clamp 16b to be easily rotated into the desired horizontal orientation and then can be pulled to be straight and aligned with insulator 38 along longitudinal axis X if desired. The lower clamp 16b can be installed by a worker on a trolley.

The second device 10 can be secured at the ⅔ span distance, in a similar manner, but in which the upper clamp 16a is fixed or secured to the middle conductor 12b in a substantially vertically downwardly hanging orientation generally or substantially inline with the longitudinal axis X of the insulator 38 and the connecting assembly 15, and the lower clamp 16b can be secured to the lower conductor 12c in a horizontal orientation transverse, perpendicular, 90° or at a right angle to vertical or the longitudinal axis X. The clamps 16a and 16b of the second antigalloping device 10 can be installed by a worker on a trolley. Depending upon the relative positions of the conductors 12, the longitudinal axis X of the connecting assemblies 15 and the axis C of the upper clamp 16a can be positioned inline with vertical, or at an angle relative to vertical. If desired, in some embodiments, the axis C of the lower clamps 16b can be oriented transverse to the longitudinal axis X in a manner that is not horizontal, but at an angle relative to horizontal. By using a long flexible cable 52 to form a large or substantial part of the connecting assembly 15, the antigalloping devices 10 in the present invention can cost about half the price of existing devices and also can be installed more easily, quickly and with less cost than devices in the prior art.

Figure 5:
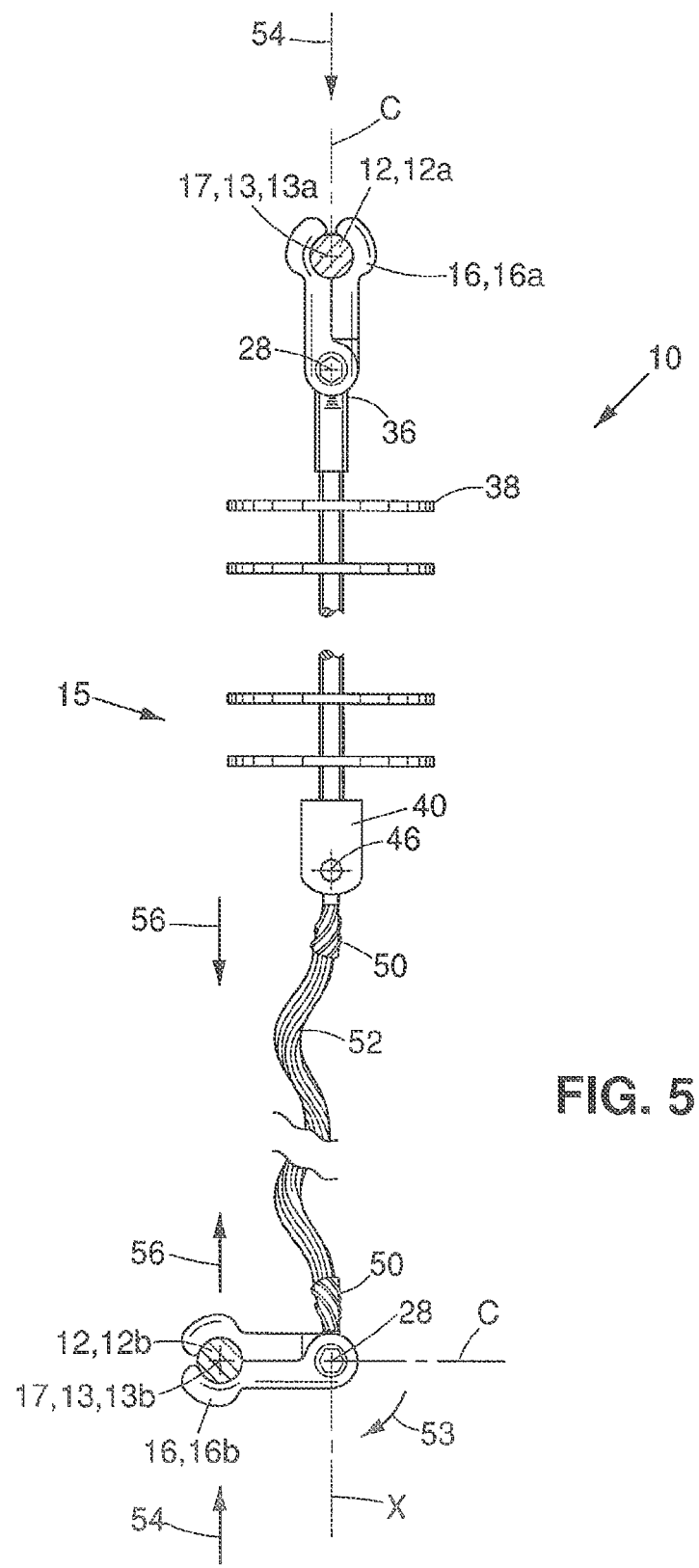
FIG. 5 is a side view of the antigalloping device shown in FIG. 4 subjected to opposed compressive forces.

Referring to FIG. 5, since the flexible cable 52 is not rigidly supported, reinforced or stiffened by additional members, if conductors 12, such as 12a and 12b, move towards each other in the direction of arrows 54, such as due to wind, during galloping, an opposed compressive force is exerted on antigalloping device 10, via the jaws 20 of clamps 16a and 16b, and can cause the ends of cable 52 to move towards each other in the direction of arrows 56, thereby collapsing, bending or buckling cable 52 to compensate for the movement of cables 12a and 12b towards each other. In addition, pivoting of insulator 38 and cable 52 about axes 28 and 46 can also occur. The antigalloping operation of device 10 does not occur during such movement of conductors 12a and 12b towards each other. The flexible nature of cable 52 attached to the middle conductor 12b or lower conductor 12c may provide some damping, however, this effect is typically minor and secondary to the normal antigalloping operation of system 9 and devices 10 as described below.

Figure 6:
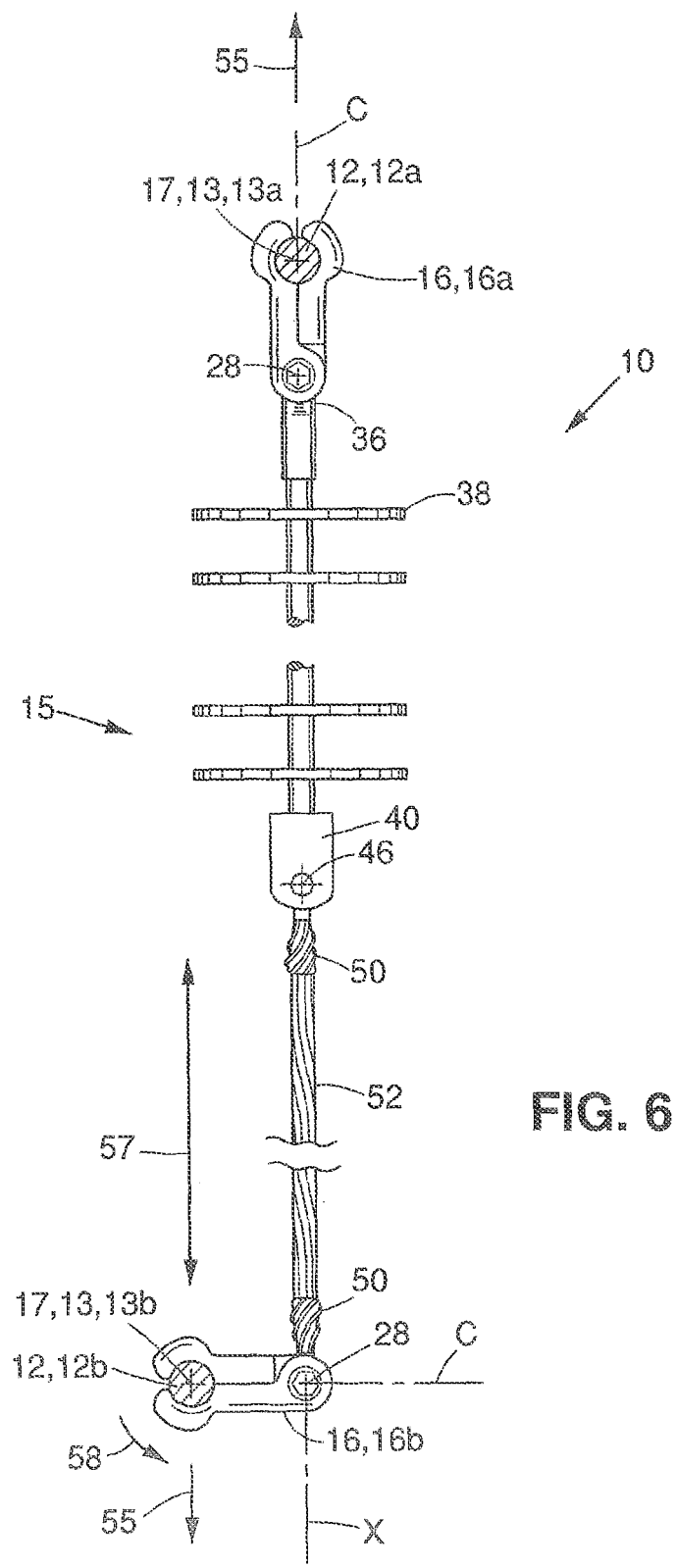
FIG. 6 is a side view of the antigalloping device shown in FIG. 4 subjected to opposed tension forces for rotating or twisting the clamped conductor.
Figure 7:
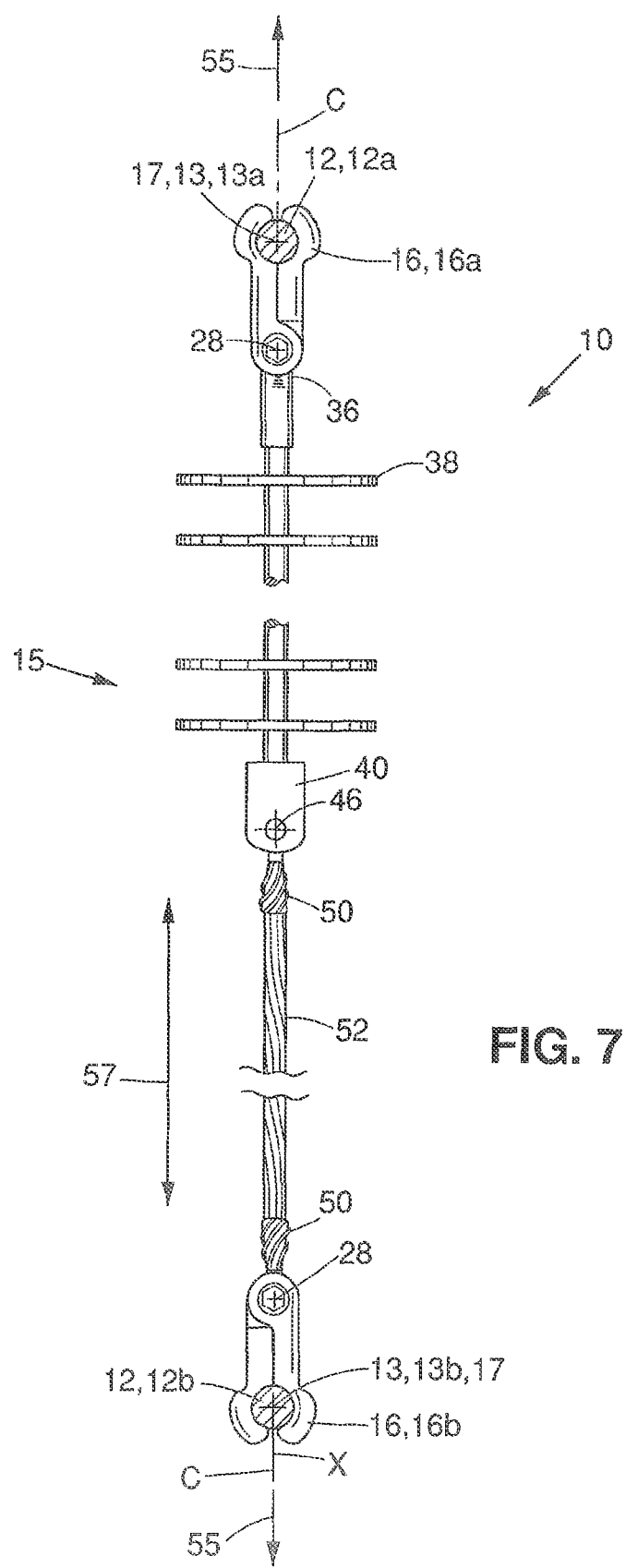
FIG. 7 is a side view of the antigalloping device shown in FIG. 6 with the lower clamp rotated in line with the longitudinal axis of the device due to opposed tension forces.

Referring to FIGS. 6 and 7, when conductors 12, such as 12a and 12b, move away from each other in the direction of arrows 55, such as due to wind, during large amplitude galloping, an opposed tension force in the direction of arrows 55 is exerted on antigalloping device 10, via the jaws 20 of clamps 16a and 16b. This can straighten out or stretch insulator 38 and cable 52 along longitudinal axis X, and exert an opposed tension force on cable 52, as indicated by arrows 57. Once cable 52 is pulled tight and straightened out along longitudinal axis X, the cable 52 does not stretch any further. When cable 52 is straightened out, large amplitude galloping motion of conductors 12a and 12b away from each other in the direction of arrows 55 can be restrained. With upper clamp 16a clamped to upper conductor 12a with its longitudinal axis C inline with the longitudinal axis X of antigalloping device 10, upper clamp 16a usually does not exert any significant twisting on upper conductor 12a. Further movement of the upper 12a and middle conductors 12b away from each other causes device 10 to pull and rotate the lower clamp 16a about axis 28, and with it the clamped middle cable 12b, downwardly in the direction of arrow 58. If the movement of conductors 12a and 12b away from each other is large enough, the lower clamp 16b and the attached middle cable 12b can be pulled or rotated 90° until the longitudinal axis C of lower clamp 16b is inline with the longitudinal axis X of device 10, as seen in FIG. 7, where antigalloping device 10 is extended into a fully straightened elongate position.

Figure 8:
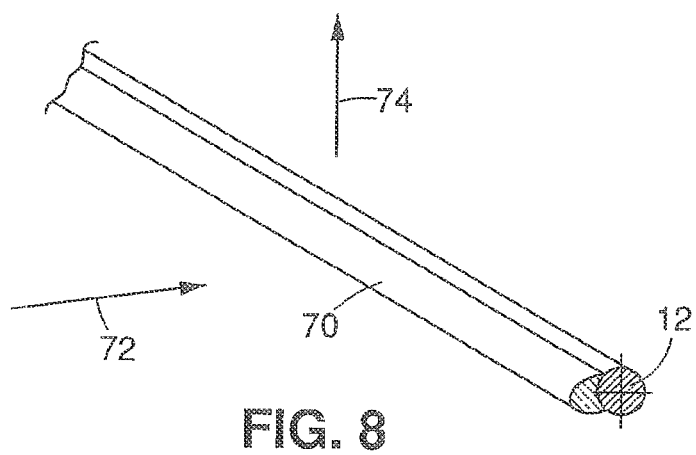
FIG. 8 is a schematic perspective view of a conductor with an aerodynamic ice structure formed thereon, forming a lifting surface.
Figure 9:
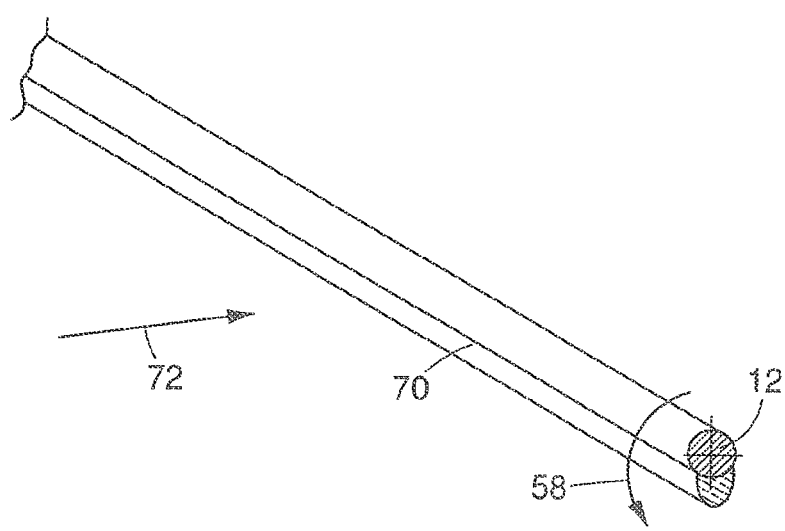
FIG. 9 is a schematic perspective view of the conductor of FIG. 8 rotated 90° to be in a non aerodynamic lifting orientation.

When ice forms an aerodynamic lifting structure 70 (FIG. 8) on a conductor 12, horizontal wind 72 blowing across structure 70 causes upward lift of the conductor 12 in the direction of arrow 74. Twisting the conductor 12 (FIG. 9) in the direction of arrow 58 can make the span of the conductor 12 stable by changing the position or angle of the aerodynamic lifting structure 70 up to 90° downward, so that the structure 70 is not in an aerodynamic wind lifting position or orientation relative to the direction of the wind 72, thereby preventing or reducing lift and galloping of the conductor 12. As little as a 10° and 15° change in angle can reduce enough lift to make the span of the conductor 12 stable. The amount of rotation of conductor 12b caused by lower clamp 16b can vary between 0° and 90°, or intermediate angles there between, depending upon the amount of distance that conductors 12a and 12b move apart from each other and the position or angle that the lower clamp 16b is initially oriented. As previously mentioned, operation of antigalloping device 10 between the middle 12b and lower 12c conductors is similar. Consequently, large amplitude galloping movement of the conductors 12 away from each other can be restrained by the length of the antigalloping devices 10 secured and extended there between, and aerodynamic lifting of the middle 12b and lower conductors 12c can be reduced or prevented by twisting or conductors 12b and 12c.

Figure 10:
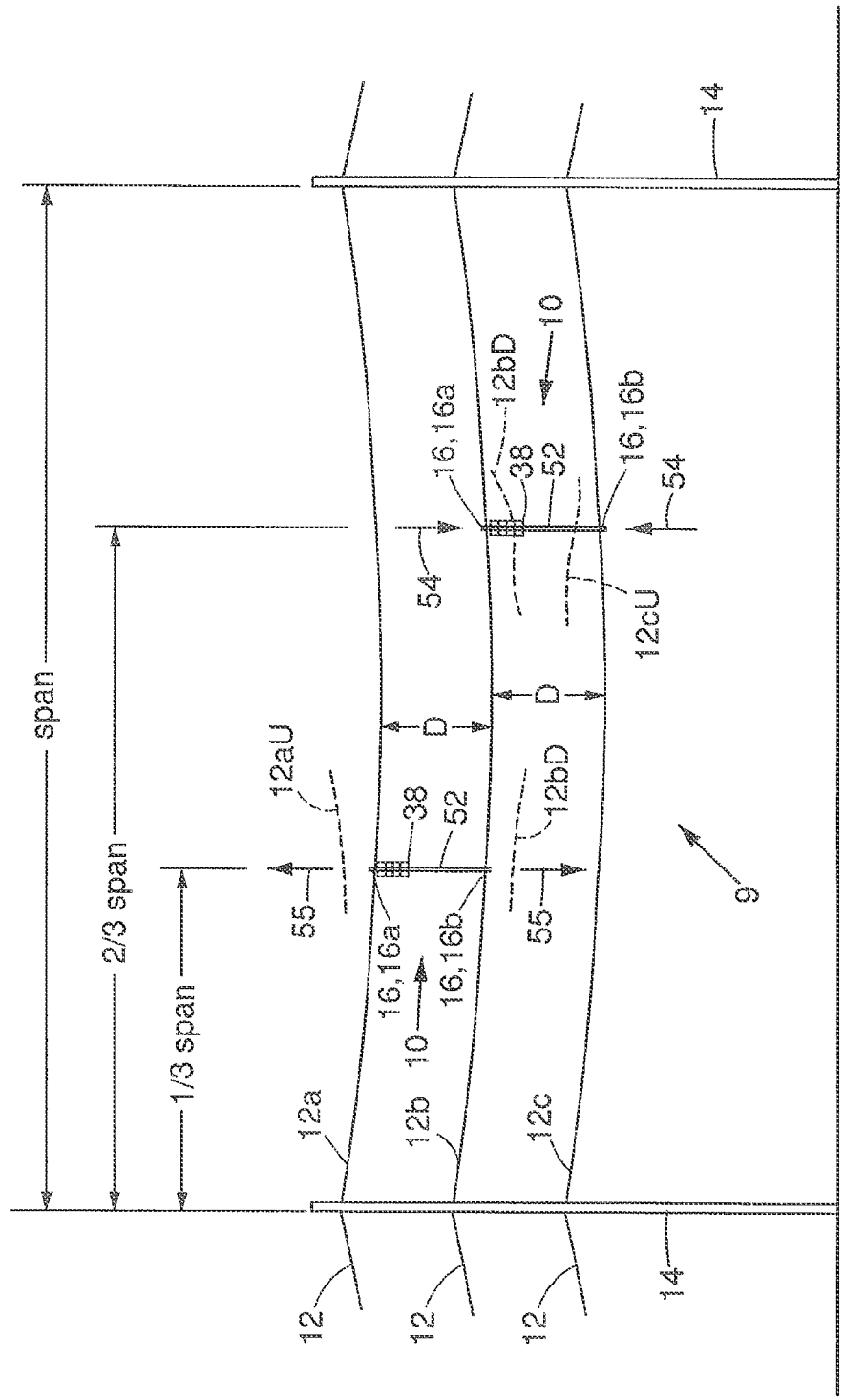
FIG. 10 is a schematic front view of an antigalloping system or antigalloping span in the present invention illustrating the upper conductor moving up, the middle conductor moving down, and the lower conductor moving up.
Figure 11:
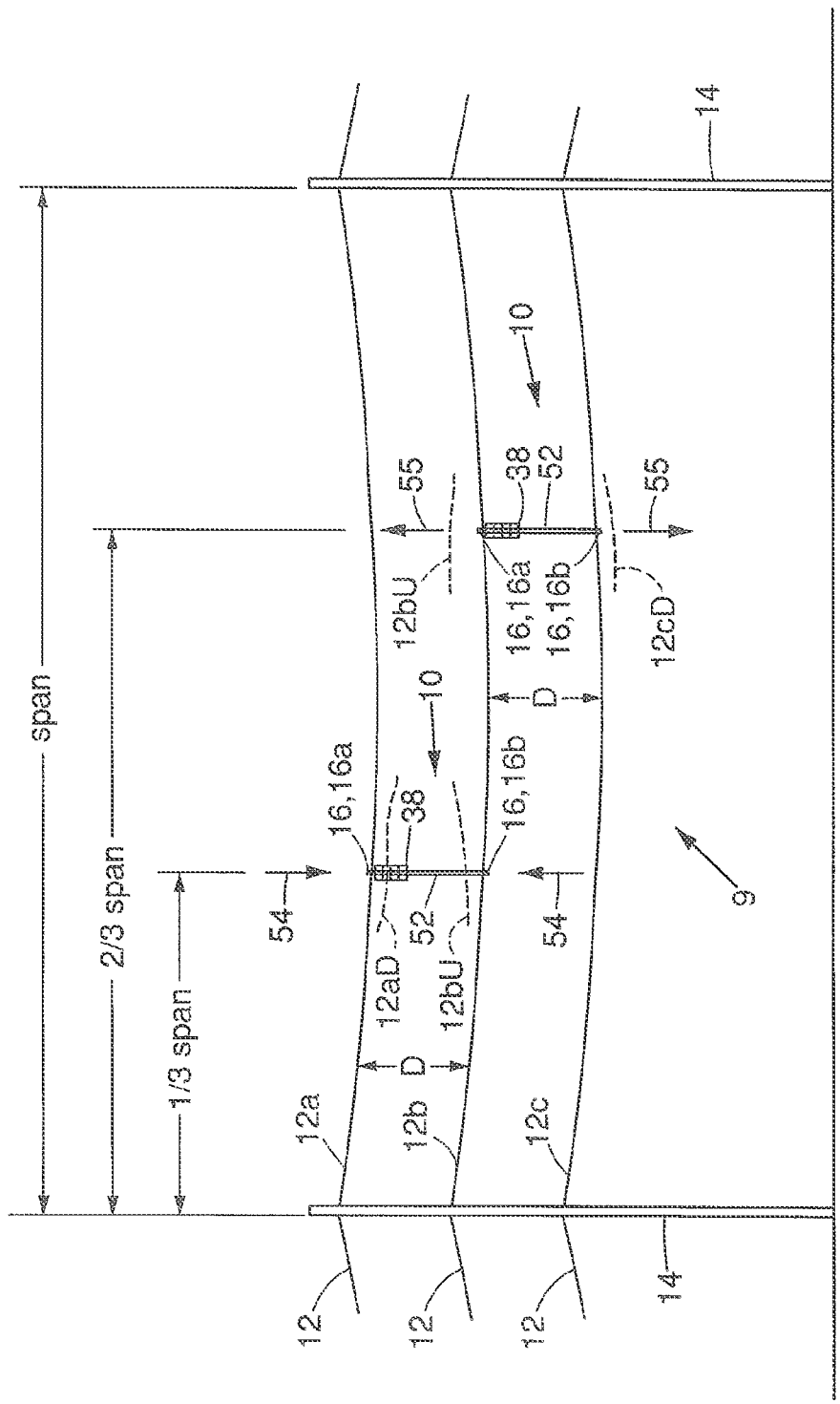
FIG. 11 is a schematic front view of an antigalloping system or antigalloping span in the present invention illustrating the upper conductor moving down, the middle conductor moving up, and the lower conductor moving down.

Referring to FIGS. 10 and 11, the antigalloping system 9 or antigalloping conductor span in some embodiments, can reduce or prevent the two typical modes of gallop in a conductor span. The first mode is symmetrical about the mid-span, in the shape of a ½ sine wave, with maximum displacement at the mid-span. The second mode is antisymmetrical about the mid-span in the shape of a full sine wave with maximum displacement at the two ¼ span points. The first and second modes have equal displacement at the ⅓ span and ⅔ span points, which is about 86% of the maximum displacement.

In one example, conductors 12 can have a diameter of about 1,162 inches, a weight of about 1.159 lb/ft, a breaking strength of about 31,900 lbs., a torsional stiffness of about 9071 lb·ft²/Rad, a first natural frequency of 0.3 Hz and a second natural frequency of 0.6 Hz. The length of the span can be 700 ft, with the ⅓ span length or distance being about 233 ft., and the ⅔ span length or distance being about 466 ft., a conductor 12 tension of about 3240 lb., a torque stiffness at the mid-span of about 5.2 ft·lb/Rad, a double amplitude motion of about 5.2 ft, a moment arm of the lower clamps 16b of about 3.5 inches, a maximum axial tension force in direction of arrows 55 of about 50 lb., and a torque stiffness at the ⅓ span and ⅔ span locations of about 5.7 ft lb./Rad. The maximum axial tension force of 50 lb. in the direction of arrows 55 can exert a torque of about 15 ft·lb., which exceeds the torque required to rotate the conductors 12 nearly 90°.

Referring back to FIG. 10 when all three phase conductors 12a, 12b, and 12c are galloping in the first mode, at a particular moment when the upper conductor or phase 12a is at its maximum upward motion or position 12aU, the middle conductor or phase 12b can be at its maximum downward motion or position 12bD, and the lower conductor or phase 12c can be at its maximum upward motion or position 12cU. In the embodiment having the dimensions or properties of the above example, the maximum up-down double amplitude motion can be about 6 ft, where the up-down double amplitude motion at the ⅓ space and ⅔ span locations can be about 5.2 feet. As a result, the antigalloping device 10 secured to the upper 12a and middle conductors 12b at the ⅓ span location, is subjected to opposite tension forces in the direction of arrows 55 due to the movement of conductors 12a and 12b in opposite directions shown by arrows 55, straightening insulator 38 and cable 52 along longitudinal axes X and rotating lower clamp 16b about axis 28 to twist or rotate middle conductor 12b, thereby reducing large amplitude motion of conductors 12a and 12b, and reducing or preventing lifting and galloping of middle conductor 12b. Although upper conductor 12a is not twisted by antigalloping device 10, with device 10 being in tension, large amplitude motion of upper conductor 12a and middle conductor 12b away from each other in the direction of arrows 55 can be restrained by the straightened device 10 between the upper conductor 12a and the middle conductor 12b to reduce or prevent galloping of the upper conductor 12a as well as middle conductor 12b. The antigalloping device 10 secured to the middle 12b and lower 12c conductors at the ⅔ span location is subjected to opposed compression forces in the direction of arrows 54 due to the movement of conductors 12b and 12c towards each other in the direction of arrows 54, and is under a slack or collapsed no load condition, and therefore, generally does not restrict motion of or twist a conductor 12b or 12c.

Referring to FIG. 11, after ½ cycle of the gallop motion, the upper conductor 12a is at its maximum downward motion or position 12aD, the middle conductor 12b is at its maximum upward motion or position 12bU, and the lower conductor 12c is at its maximum downward motion or position 12cD. The antigalloping device 10 at the ⅓ span location is now subjected to opposed compression forces in the direction of arrows 54 due to the movement of conductors 12a and 12b towards each other in the direction of arrows 54, and therefore, generally does not restrict motion of or twist a conductor 12a or 12b. In addition, the antigalloping device 10 at the ⅔ span location is now subjected to opposed tension forces in the direction of arrows 55 due to the movement of conductors 12b and 12c away from each other in the direction of arrows 55, thereby straightening insulator 38 and cable 52 along longitudinal axis X and rotating lower clamp 16b about axis 28 to twist or rotate lower conductor 12c, thereby reducing large amplitude motion of conductors 12b and 12c, and reducing or preventing lifting and galloping of lower conductor 12c. The large amplitude galloping motion of the middle 12b and lower 12c conductors away from each other in the direction of arrows 55 can be restrained by the straightened device 10 secured between the middle conductor 12b and the lower conductor 12c. The second gallop mode can be twice as fast as the first mode, while the maximum amplitudes at the ⅓ span and ⅔ span locations can be the same. Consequently, during galloping, one antigalloping device 10 can be under tension and stabilizing the entire span for ½ the cycle of the gallop motion while the other antigalloping device 10 is under no load or provides no support, and then in the other ½ of the cycle of the gallop motion, the antigalloping device 10 that was previously under tension is now under no load and the other antigalloping device 10 that was previously unloaded is now under tension and stabilizing the entire span. As a result, the two antigalloping devices 10 can individually sequentially stabilize galloping in the span, each for ½ the cycle of the gallop motion. Each antigalloping device 10 does not reduce or prevent galloping when opposed compression forces are exerted thereon, but sufficient reduction or prevention of galloping can be obtained only when the antigalloping devices 10 are subjected to opposed tension, by restricting movement of the attached cables or conductors 12 apart from each other, and reducing or preventing lift of the conductor attached to the lower clamp 16b. This can create a square wave of the force waveform, and these square wave time histories or highly non-linear motion time histories can be easily analyzed by fourier series methods by breaking the wave form down into harmonic components.

The conductors 12 can act as linear springs to create the opposed tension in the antigalloping devices 10. Although the antigalloping system 9 or antigalloping span is shown in the drawings to have a device 10 at the ⅓ span on the left between the upper 12a and middle 12b conductors, and a device 10 at the ⅔ span at the right between the middle 12b and lower 12c conductors, in other embodiments, the positions can be reversed. Also, the span could be measured from the right-hand side with the ⅓ span being at the right and the ⅔ span being at the left, or the span could be viewed while facing the opposite side of the span.

Figure 12:
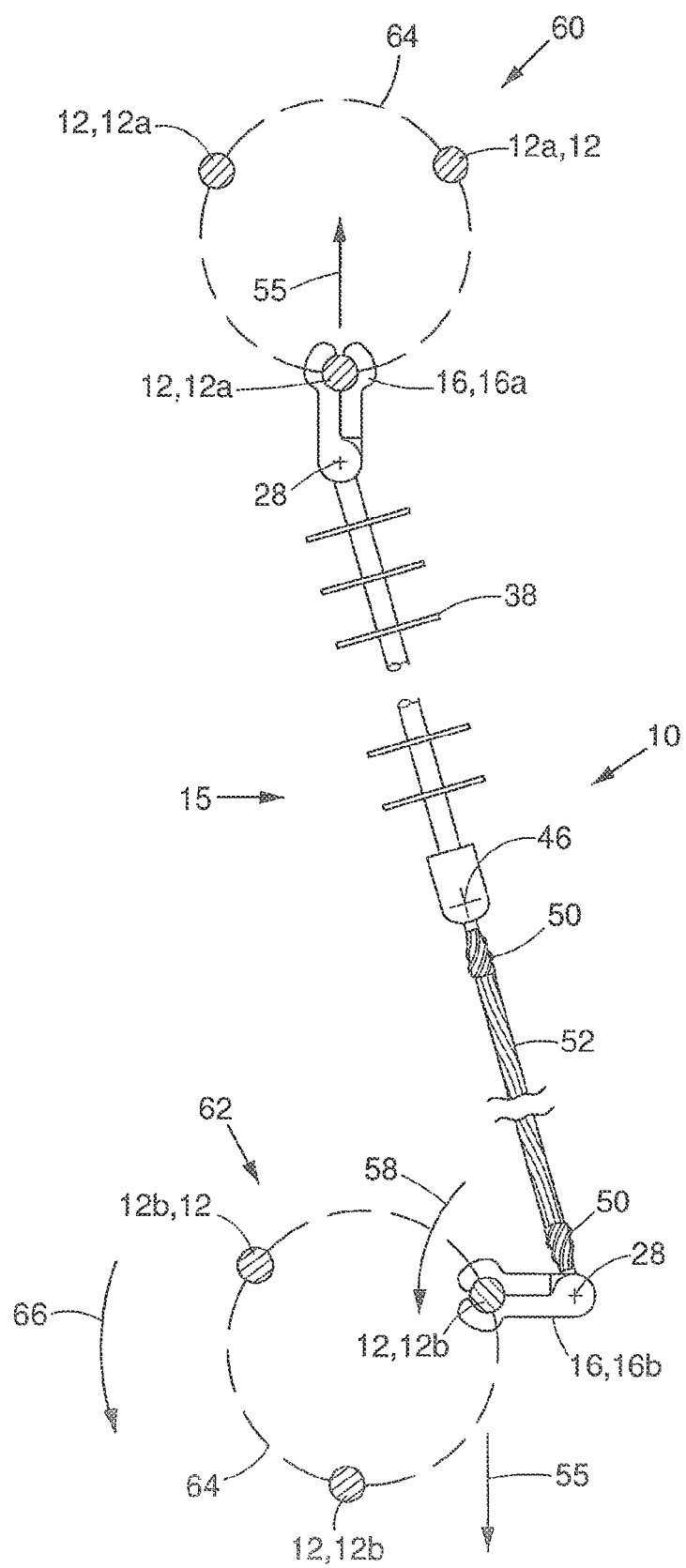
FIG. 12 is a schematic side view of an antigalloping device in the present invention connected to upper and middle bundles of conductors.
Figure 13:
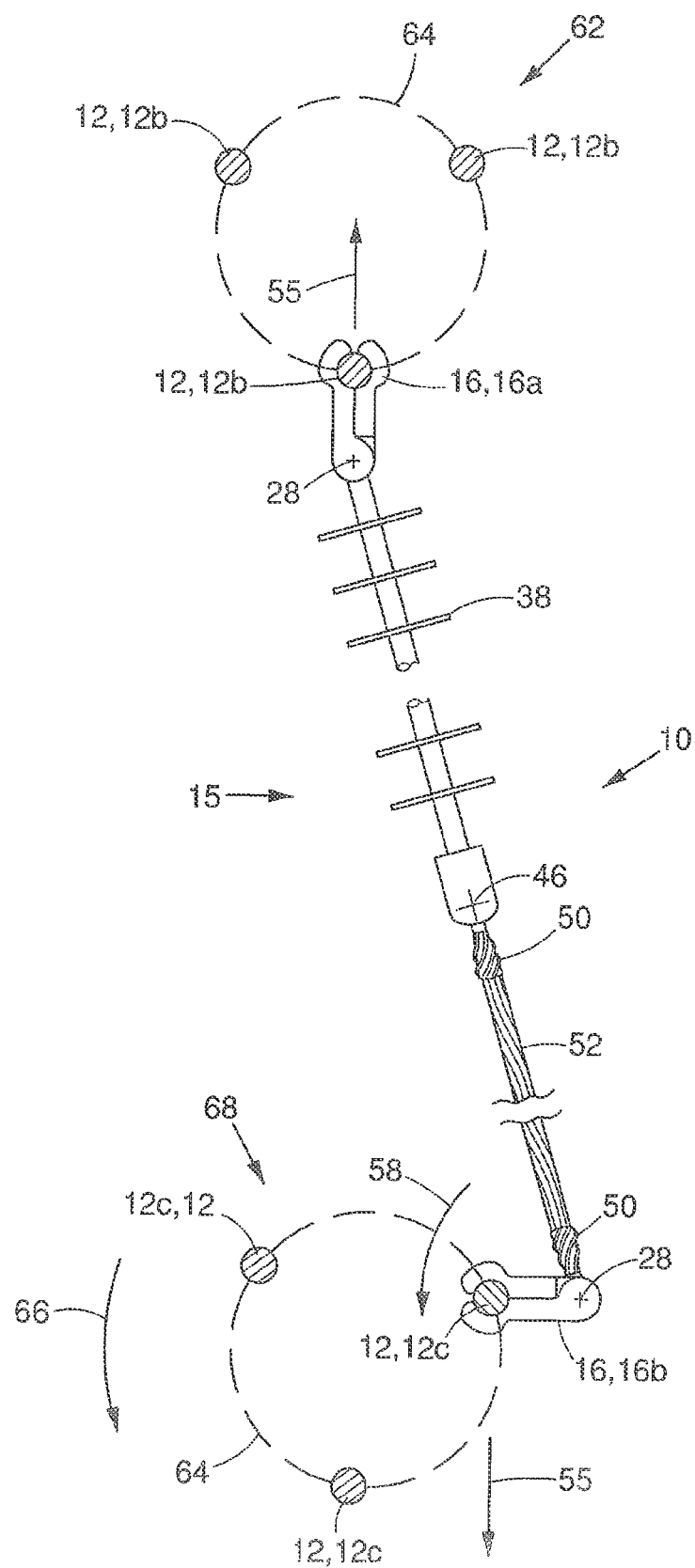
FIG. 13 is a schematic side view of an antigalloping device in the present invention connected to middle and lower bundles of conductors.
Figure 14:
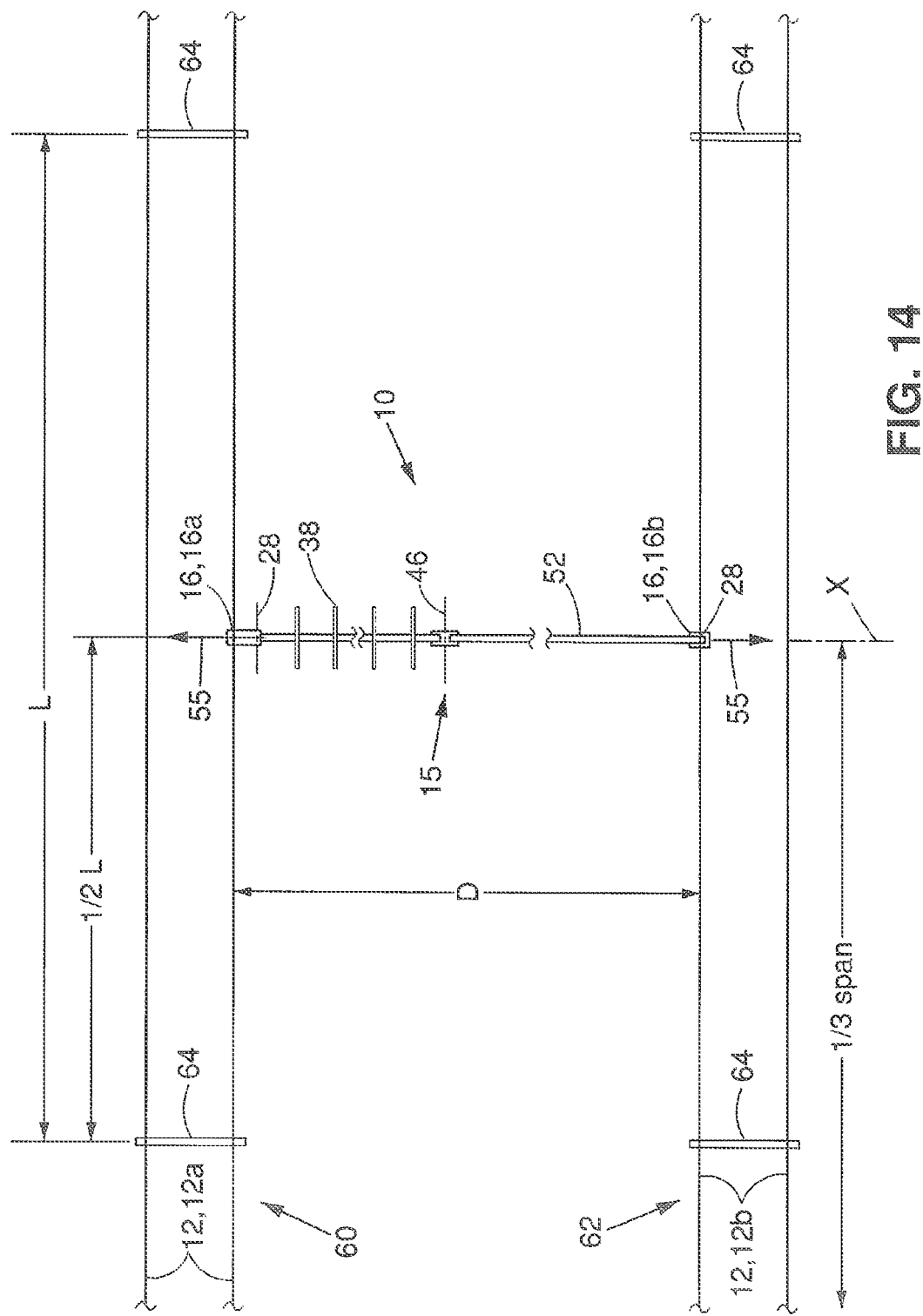
FIG. 14 is a schematic front view of the device of FIG. 12 connected to the upper and middle bundles.
Figure 15:
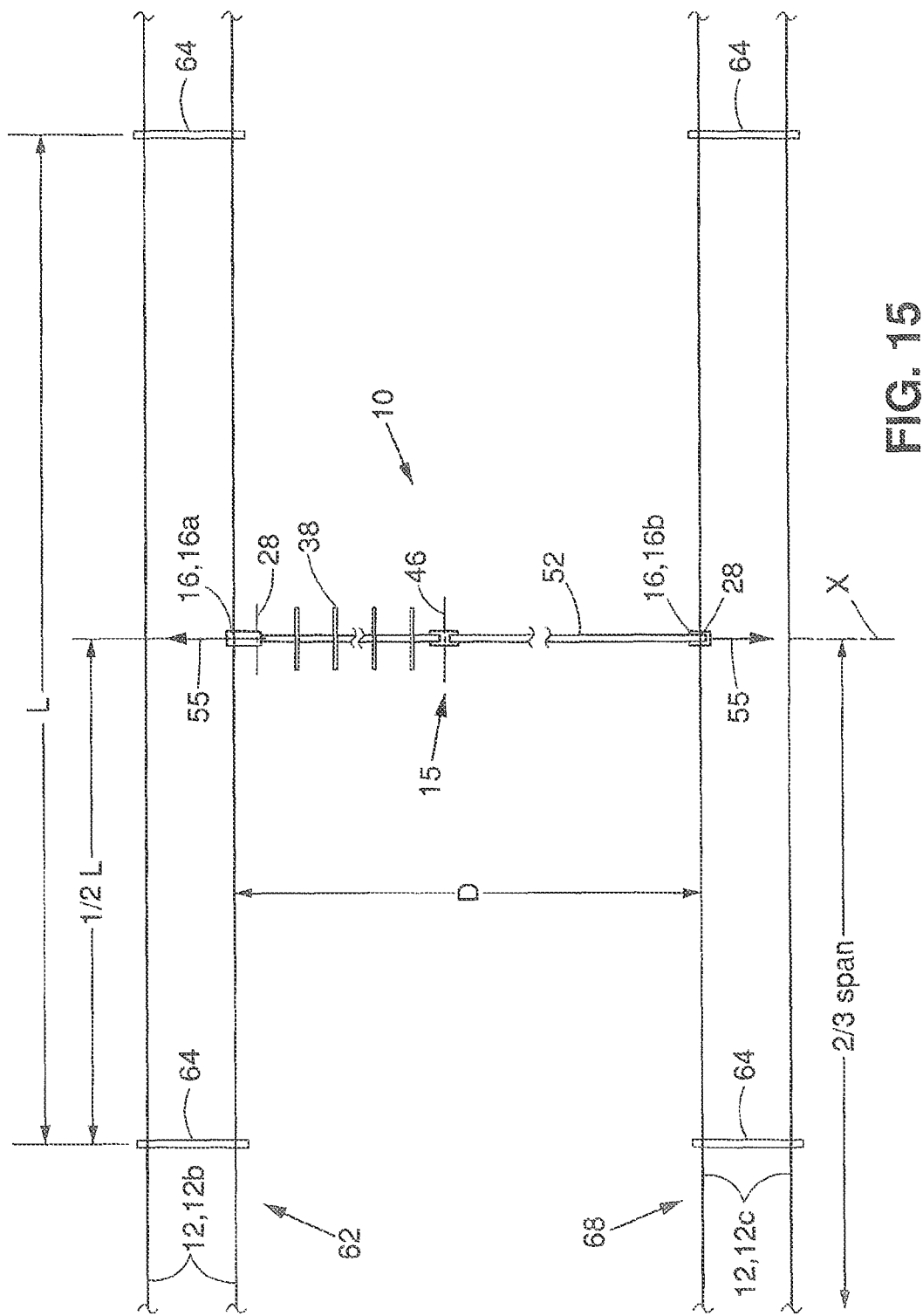
FIG. 15 is a schematic front view of the device of FIG. 13 connected to the middle and lower bundles.

Referring to FIGS. 12-15, in other embodiments, the antigalloping system 9 or antigalloping span can include bundles of conductors 12, where each phase can have a bundle. FIGS. 12 and 14 depict a first, top or upper triple bundle 60 containing 3 first, top or upper phases, lines, cables or conductors 12a, and a second, intermediate or middle triple bundle 62 containing 3 second, intermediate or middle phases, lines, cables or conductors 12b. The middle bundle 62 and the third, bottom or lower triple bundle 68 of 3 third, bottom or lower phases, lines, cables or conductors 12c is shown in FIGS. 13 and 15. It is understood that bundles of 2 conductors or bundles of more than 3 conductors are also envisioned. Each bundle 60, 62, and 68, can include bundle spacers, rings, members or devices 64 for spacing the conductors 12 in each bundle. Each spacer 64 can be spaced apart from each other by a length or distance L, for example in some embodiments, about 200 ft. The antigalloping devices 10 can be secured to the ⅓ span and ⅔ span locations in a span of conductors 12, to upper 12a, middle 12b, and lower 12c conductors, in the upper 60, middle 62, and lower 68 bundles. Depending upon the relative positions of the conductors 12 and bundles 60, 62 and 68, the longitudinal axes X of the connecting assemblies 15 and axes C of the upper clamps 16a can be inline or at an angle to vertical Referring to FIGS. 12 and 14, the upper clamp 16a of the antigalloping device 10 at the ⅓ span location can be secured to an upper conductor 12a in the upper bundle 60 that is at the bottom of the upper bundle 60. The lower clamp 16b can be secured to a middle conductor 12b in the middle bundle 62 that is near the top of the middle bundle 62. The device 10 can be positioned halfway between two spacers 64, at the ½ L location, for example, 100 ft when L=200 ft. Consequently, when the antigalloping device 10 at the ⅓ span location is subjected to opposed tension forces by movement of conductors 12a and 12b within bundles 60 and 62 away from each other in the direction of arrows 55, and straightened out along longitudinal axis X, large amplitude galloping motion in the upper conductors 12a of upper bundle 60 and the middle conductors 12b of the middle bundle 62 away from each other in the direction of arrows 55 can be restrained by the length of the antigalloping device 10 secured to and extending therebetween, and the lower clamp 16b and with it the clamped middle conductor 12b, can rotate or twist about axis 28 in the direction of arrow 58 to prevent or reduce aerodynamic lift in a similar manner as previously described. Since the middle conductors 12b in the middle bundle 62 are secured to each other by the spacers 64, the middle bundle 62 can in some cases also rotate in the direction of arrow 66. In this manner, aerodynamic lift of the middle conductors 12b in the middle bundle 62 can be reduced or prevented.

Referring to FIGS. 13 and 15, the upper clamp 16a of the antigalloping device 10 at the ⅔ span location can be secured to a middle conductor 12b in the middle bundle 62 that is at the bottom of the middle bundle 62. The lower clamp 16b can be secured to a lower conductor 12c in the lower bundle 68 that is near the top of the lower bundle 68. The device 10 can be positioned halfway between two spacers 64, at the ½ L location. When the antigalloping device 10 at the ⅔ span location is subjected to opposed tension forces by movement of conductors 12b and 12c in the direction of arrows 55 and straightened out along longitudinal axis X, large amplitude galloping motion in the middle conductors 12b of the middle bundle 62 and the lower conductors 12c of the lower bundle 68 away from each other in the direction of arrows 55 can be restrained by the length of the antigalloping device 10 secured to and extending therebetween, and the lower clamp 16b and with it the clamped lower conductor 12c, can rotate or twist about axis 28 in the direction of arrow 58 to prevent or reduce aerodynamic lift in a similar manner as previously described. Since the lower conductors, 12c in the lower bundle 68 are secured to each other by the spacers 64, the lower bundle 68 in some cases can also rotate in the direction of arrow 66. In this manner, aerodynamic lift of the lower conductors 12c in the lower bundle 68 can be reduced or prevented. Galloping over the span can be reduced or prevented by sequential operation of the two antigalloping devices 10 in a similar manner as previously described earlier with respect to FIGS. 10 and 11. In some embodiments, different conductors 12 or conductor series in the bundles 60, 62 and 68 can be clamped or connected to than those shown.

In some embodiments, the antigalloping system 9 or antigalloping conductor span (single or bundled conductors) can have a span of conductors 12 that is less than 700 feet long, for example, 500 to 600 feet. In such a case, a single antigalloping device 10 can be positioned at the ½ span location (shown in FIG. 1 in phantom) between the middle 12b and lower 12c conductors (or middle and lower bundles 62 and 68), which can sufficiently reduce gallop. If the span is longer than 1200 feet, for example 1800 feet, three antigalloping devices 10 can be used, at the ⅓ span location between the upper and middle conductors 12a and 12b (or upper and middle bundles 60 and 62), and at the ½ and ⅔ span locations between the middle and lower conductors 12b and 12c (or middle and lower bundles 62 and 68), for example, as seen in FIG. 1.

Figure 16:
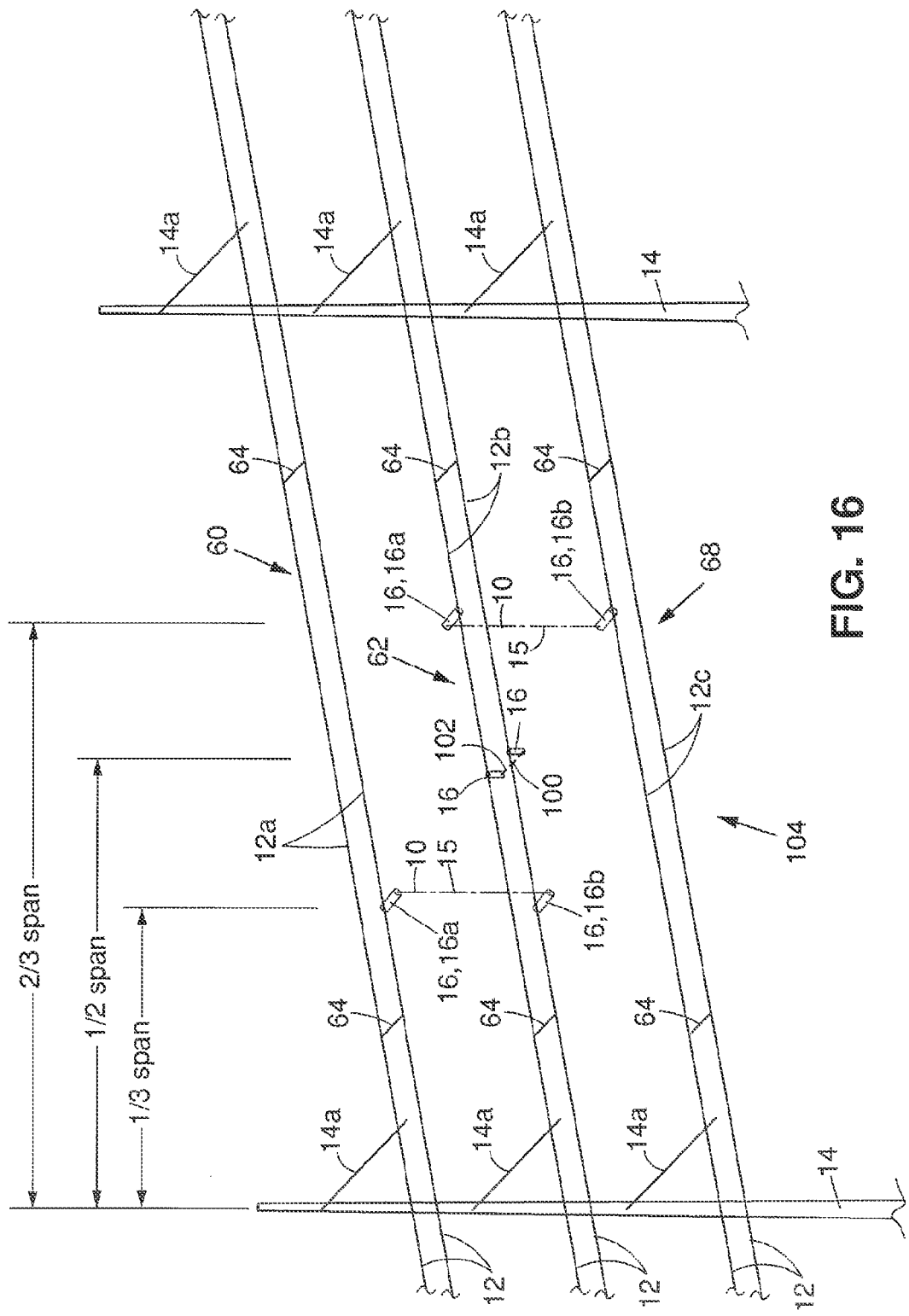
FIG. 16 is a schematic perspective view of another antigalloping system or antigalloping span in the present invention.
Figure 17:
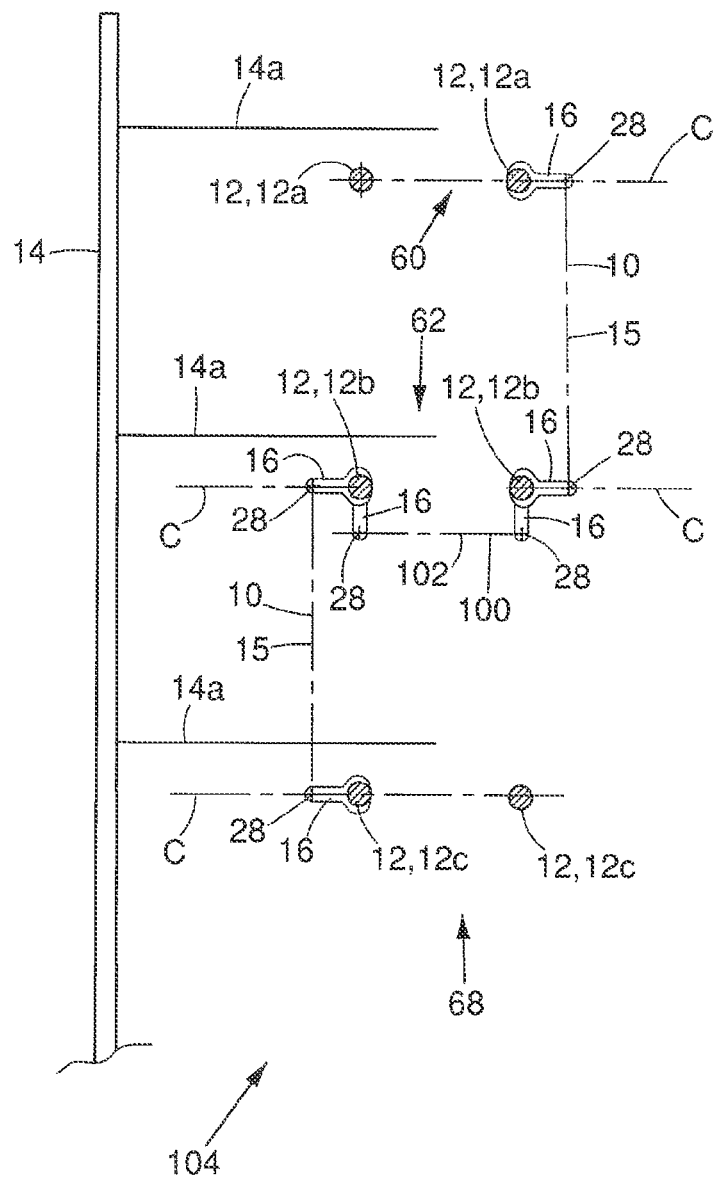
FIG. 17 is a schematic side or end view of the system or span of FIG. 16.

Referring to FIGS. 16 and 17, antigalloping system or antigalloping span 104 can have bundles of lateral or horizontally spaced cables or conductors 12, and can include a first, top or upper twin bundle 60 containing 2 first, top or upper phases, lines, cables or conductors 12a, a second, intermediate or middle twin bundle 62 containing 2 second, intermediate or middle phases, lines, cables or conductors 12b, and a third, bottom or lower twin bundle 68 of 2 third, bottom or lower phases, lines, cables or conductors 12c. The conductors 12 in each bundle 60, 62 and 68 can be connected to and spaced by spacers 64, and can be suspended from arms 14a of poles 14. A first, top or upper antigalloping device 10 can be coupled, connected or secured at the ⅓ span location to and between the upper bundle 60 and the middle bundle 62, and to vertically aligned upper 12a and middle 12b conductors, such as on the right side as shown. A second, bottom or lower antigalloping device 10 can be coupled, connected or secured at the ⅔ span location to and between the middle bundle 62 and the lower bundle 68, and to vertically aligned middle 12b and lower 12c conductors, on the opposite side of the bundles, such as on the left side as shown. The upper clamps 16 or 16a of the antigalloping devices 10 can be hung from respective conductors 12a and 12b with a rotationally upward initial position of 90 to 150° from bottom vertical so that the weight of the antigalloping devices 10 can pull the upper clamps 16a rotationally downwardly and provide an initial twist on cables 12a and 12b. Upper clamps 16a and axes C are shown to be positioned about 90° to vertical, or horizontal and parallel to the ground. The lower clamps 16 or 16b of antigalloping devices 10 can be secured to respective conductors 12b and 12c with axes C at 90° to vertical, or horizontal or parallel to the ground with or without a pretwist. Galloping in span 104 can be reduced in a similar manner as previously described. When the conductors 12 move away from each other, and exert an opposed tension force on the antigalloping devices 10, the conductors 12 can be twisted to reduce lift and galloping caused by ice structures 70. In addition, with an initial twist of the upper 12a and middle 12b conductors caused by the weight of the antigalloping devices 10, at particular moments of galloping when the galloping devices 10 are thrown or moved upwards and their weight is not exerted on conductors 12, 12a or 12b, the conductors 12, 12a or 12b can also be twist back to their natural untwisted resting position or angular orientation which can also reduce lift and galloping caused by ice structures 70 by moving to a non aerodynamic lifting position. If conductor 12c is pretwisted, conductor 12c can also twist back to a resting position.

Figure 18:
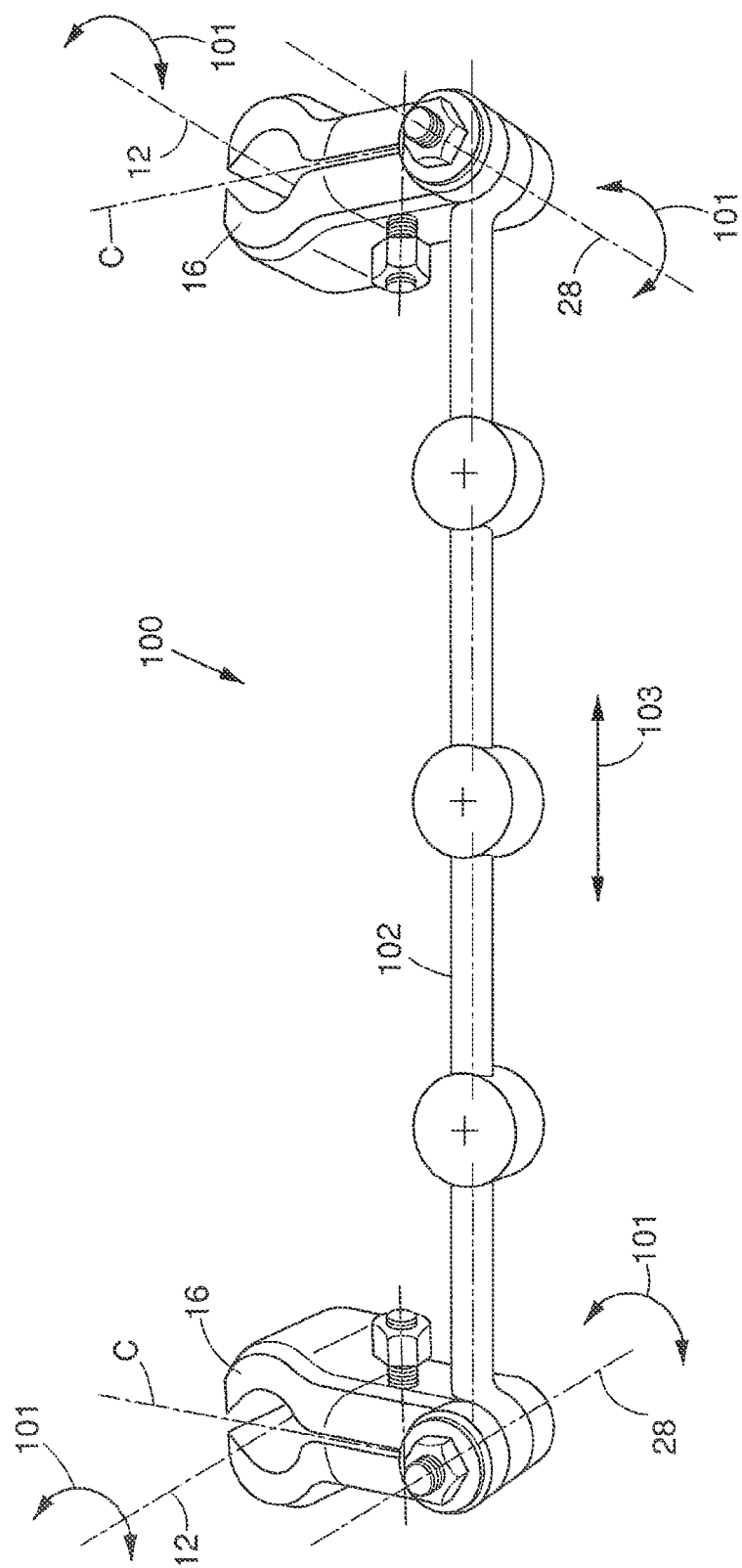
FIG. 18 is a perspective drawing of an embodiment of a spacer device.

A spacer device 100 (FIG. 18) having a rigid elongate spacer or spacing rod or member 102 rotatably coupled to and between two clamps 16 at opposite ends about clamp joint axes 28, can be secured at the ½ span location to middle bundle 62 generally laterally or horizontally between laterally spaced conductors 12b. The clamps 16 of spacer 100 can hang vertically downward from conductors 12b and the spacing member 102 can be oriented generally horizontally between the clamps 16. The spacer 100 can connect or restrain the right and left sides of the span 104 together in a manner that allows some movement and rotation of conductors 12b. Twisting of one conductor 12b at either the ⅓ or ⅔ span locations caused by an antigalloping device 10, can cause the attached clamp 16 of the spacer device 100 at the ½ span location to rotate with the conductor 12b. Since the spacing rod 102 is rotatably connected between two clamps 16, the rotation of the initially twisted conductor 12b and attached clamp 16 is transferred by the spacing rod 102 to cause rotation of the other clamp 16 at the opposite end to cause twisting of the other conductor 12b at the ½ span location. Referring to FIG. 18, twisting of one conductor 12 in the direction of arrows 101 causes rotation of attached clamp 16 in the same direction 101, thereby moving or translating spacing rod 102 in the direction of arrows 103, for example laterally. This causes rotation of the clamp 16 at the other end of the spacing rod 102 in the same direction of arrows 101, thereby causing twisting of the other conductor 12 by the respective attached clamp 16 in the same direction of arrows 101. The spacer device 100 can be the same or similar to those shown and described in U.S. application Ser. No. 13/008,112, filed Jan. 18, 2011, entitled "Spacer Device," the entire contents of which is incorporated by herein reference.

In one embodiment, span 104 can be 1000 feet long, with the ⅓ span location being about 300 feet, the ⅔ span location being about 700 feet and the ½ span location being about 500 feet. The lateral distance between the conductors 12 in the twin bundles 60, 62 and 68 can be about 18 inches. The vertical distance between the bundles 60, 62 and 68 can be about 25 feet. The bundle spacers 64 can be positioned within bundles 60, 62 and 68 at about the 200 and 800 foot locations.

Figure 19:
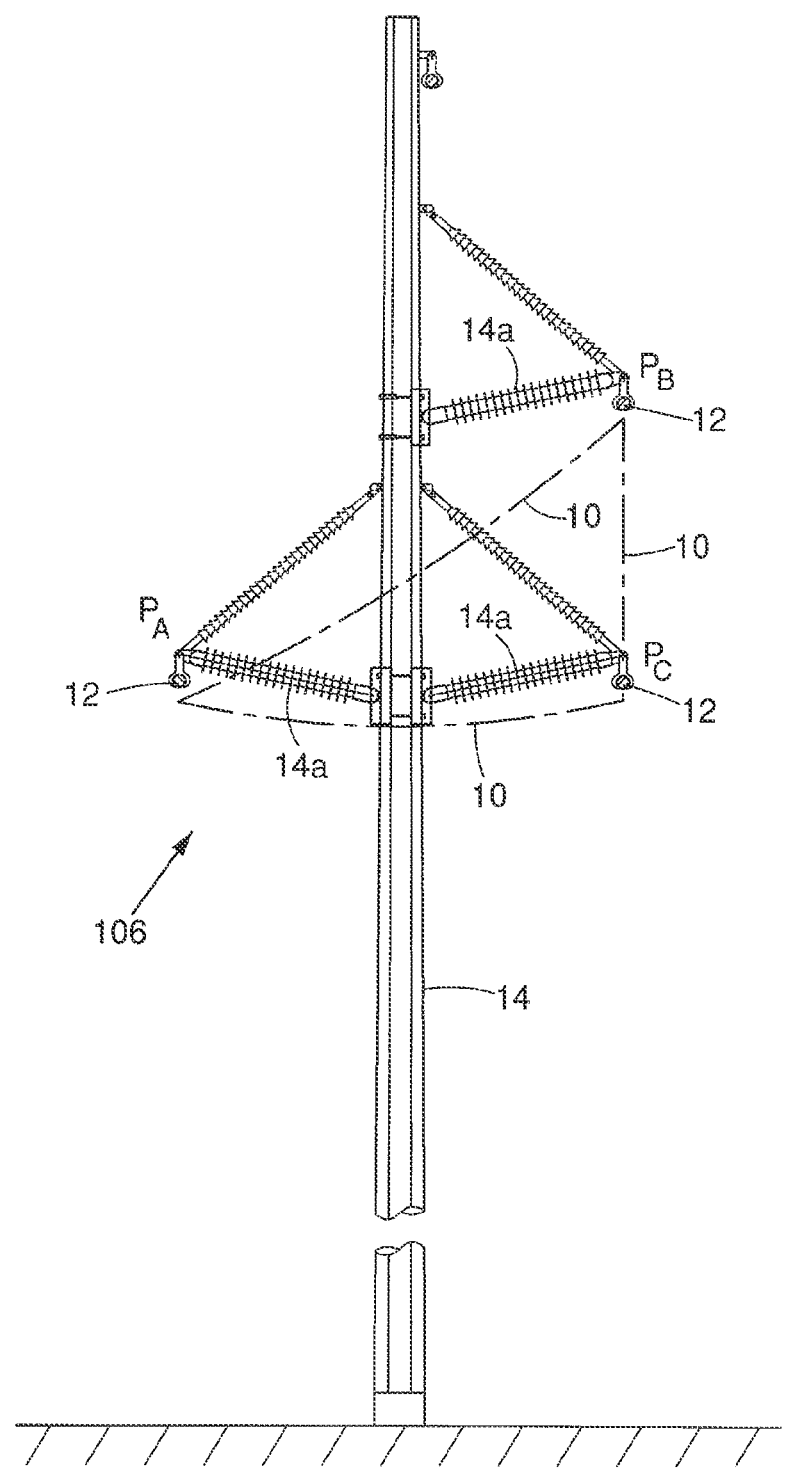
FIG. 19 is a side or end view of another antigalloping system or antigalloping span in the present invention.
Figure 20:
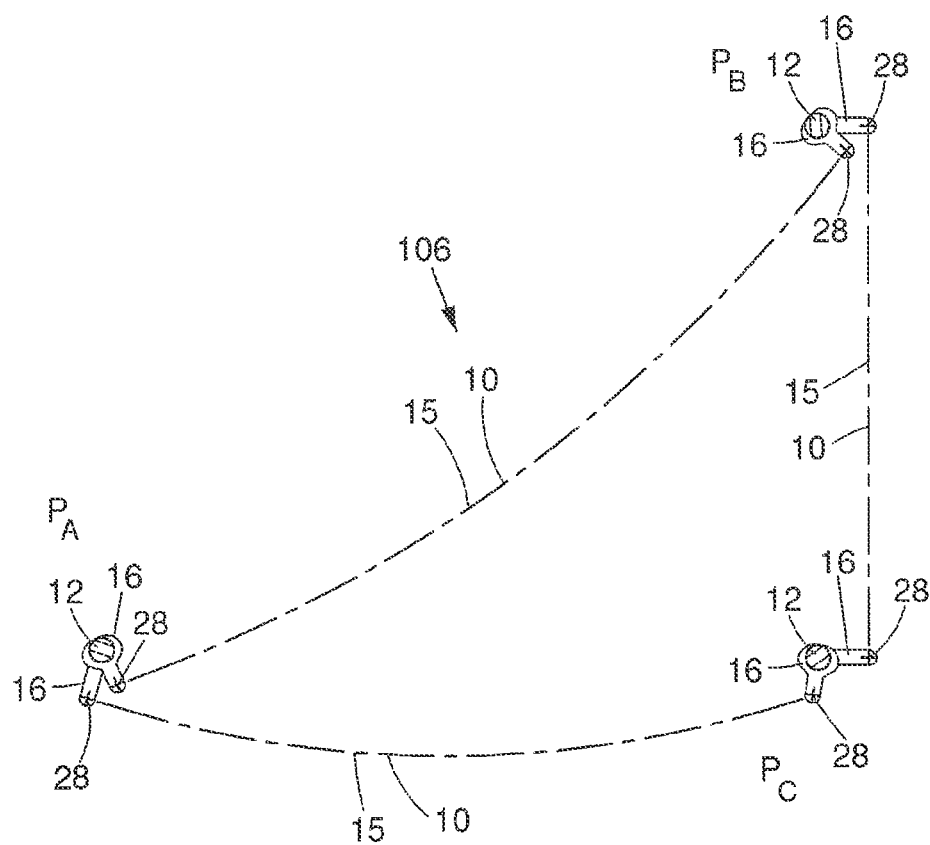
FIG. 20 is a schematic side or end view of the system or span of FIG. 19.

Referring to FIGS. 19 and 20, antigalloping system or antigalloping span 106 can have cables or conductors 12 suspended by arms 14 from pole 14, two laterally spaced lower conductors 12 on opposite sides of the pole 14, and a third upper conductor 12 positioned vertically above one of the lower conductors 12, at positions $P_A$, $P_B$ and $P_C$. A first antigalloping device 10 can be secured to the conductors 12 at positions $P_A$ and $P_B$ along an inclined angle with a slight catenary curve at the ⅓ span location, a second antigalloping device 10 can be second to the conductors 12 at positions $P_A$ and $P_C$ generally horizontally with a slight catenary curve at the ⅔ span location, and a third antigalloping device 10 can be secured to the conductors 12 at positions $P_B$ and $P_C$ generally vertically at the ½ span location. The clamps 16 of the antigalloping devices 10 can be secured to the conductors 12 in a manner such that the weight of the antigalloping devices 10 can exert an initial twist on the conductors 12 as previously described and as shown. Conductors 12 that are laterally spaced apart, either horizontally or at an angle, $P_B$ relative to $P_A$, or $P_C$ relative to $P_A$, generally do not gallop in unison, so that upward movement of one lateral conductor 12 relative to the other can cause the conductors 12 to move apart relative to each other, rotating the clamps 16, and twisting the conductors 12, and reducing galloping in similar manner as previously described. In addition, moments at which the antigalloping devices 10 are weightless relative to the conductors 12 can allow the conductors 12 to twist back to their normal untwisted rest positions, which can reduce galloping in a similar manner as previously described. In one embodiment, positions $P_A$ and $P_C$ can be laterally spaced about 20 feet apart, and position $P_B$ can be vertically about 12-15 feet above position $P_C$.

Figure 21:
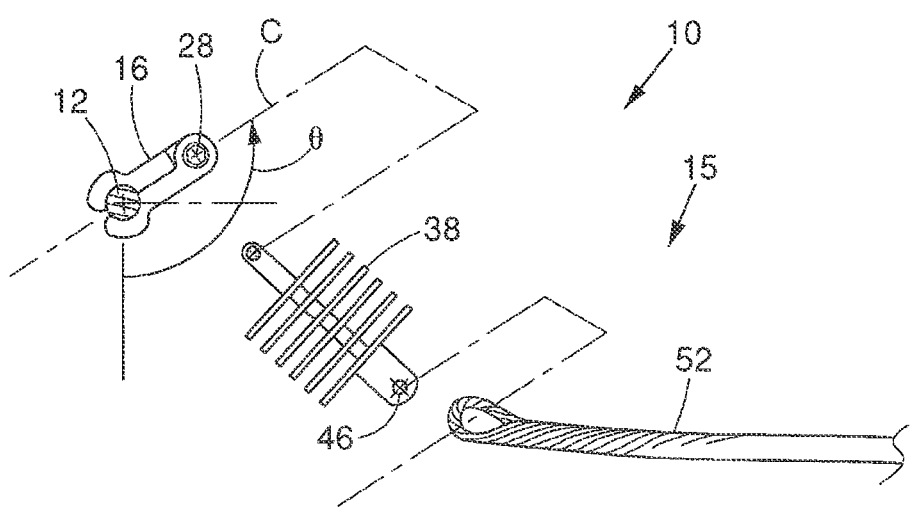
FIG. 21 is an exploded side view of a portion of an antigalloping device depicting an initial clamp attachment position which can be for a lateral or horizontal positioned antigalloping device.

FIG. 21 depicts one end of an antigalloping device 10 being secured to a conductor 12 for providing the conductor 12 with an initial or pretwist, where the connecting assembly 15 and the antigalloping device 10 can be positioned in a generally lateral or horizontal orientation with a slight generally catenary curve. The clamps 16 at each end of the connecting assembly 15 can be attached to laterally spaced apart conductors 12 by first securing the clamps 16 to the conductors 12 with the longitudinal axes C being at an angle θ rotationally upward from bottom vertical, such as 90°, or 150° as shown, which can depend upon the weight of the antigalloping device 10. The clamps 16 are typically initially on the inner sides of the conductors 12 that face each other. Once the clamps 16 are secured to the conductors 12, the weight of the antigalloping device 10 can rotatably pull the clamps 16 downwardly so that the clamps 16 and longitudinal axes C are close to or aligned with vertical, thereby forming an initial twist onto the conductors 12.

Figure 22:
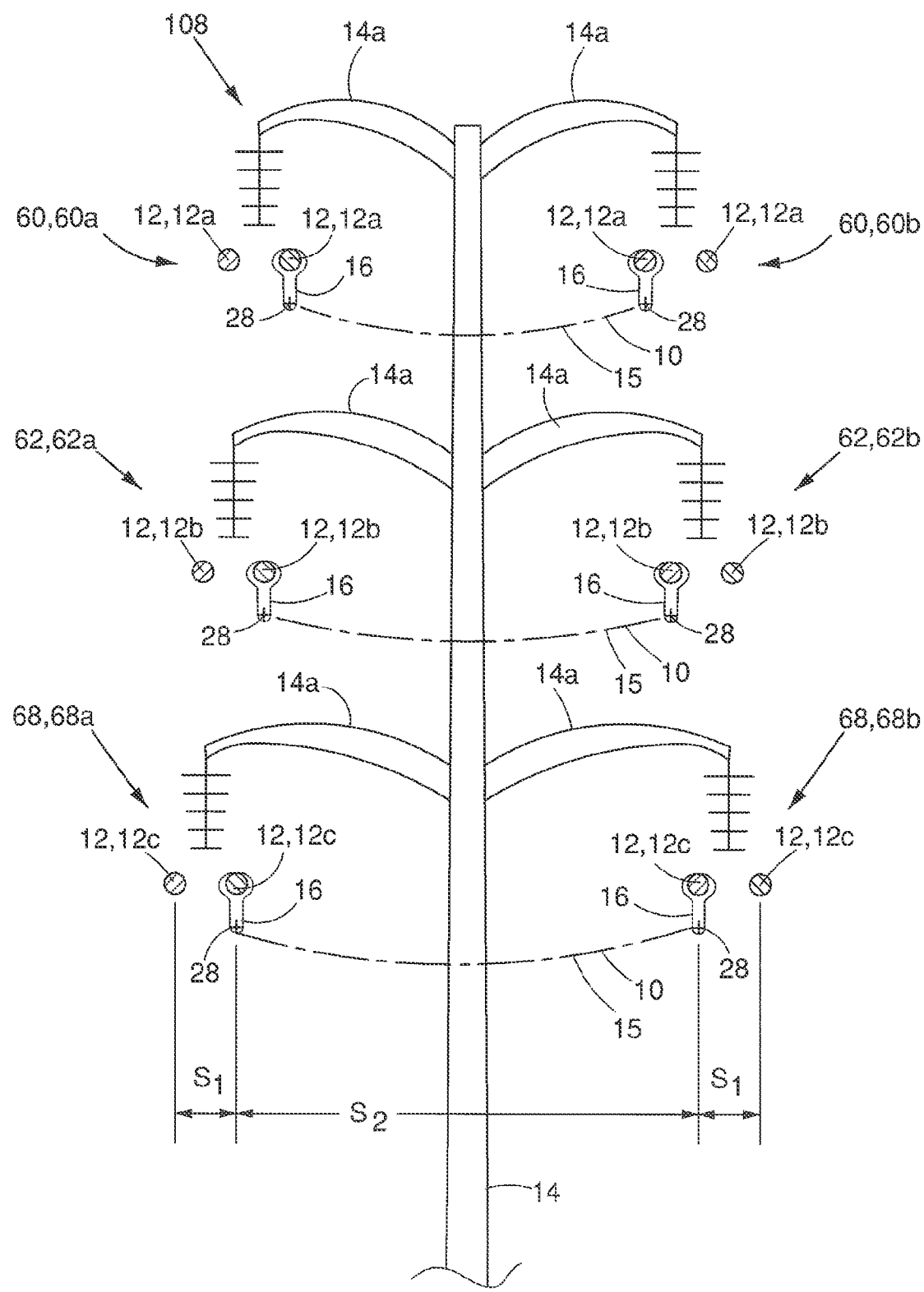
FIG. 22 is a schematic side or end view of another antigalloping system or antigalloping span in the present invention.
Figure 23:
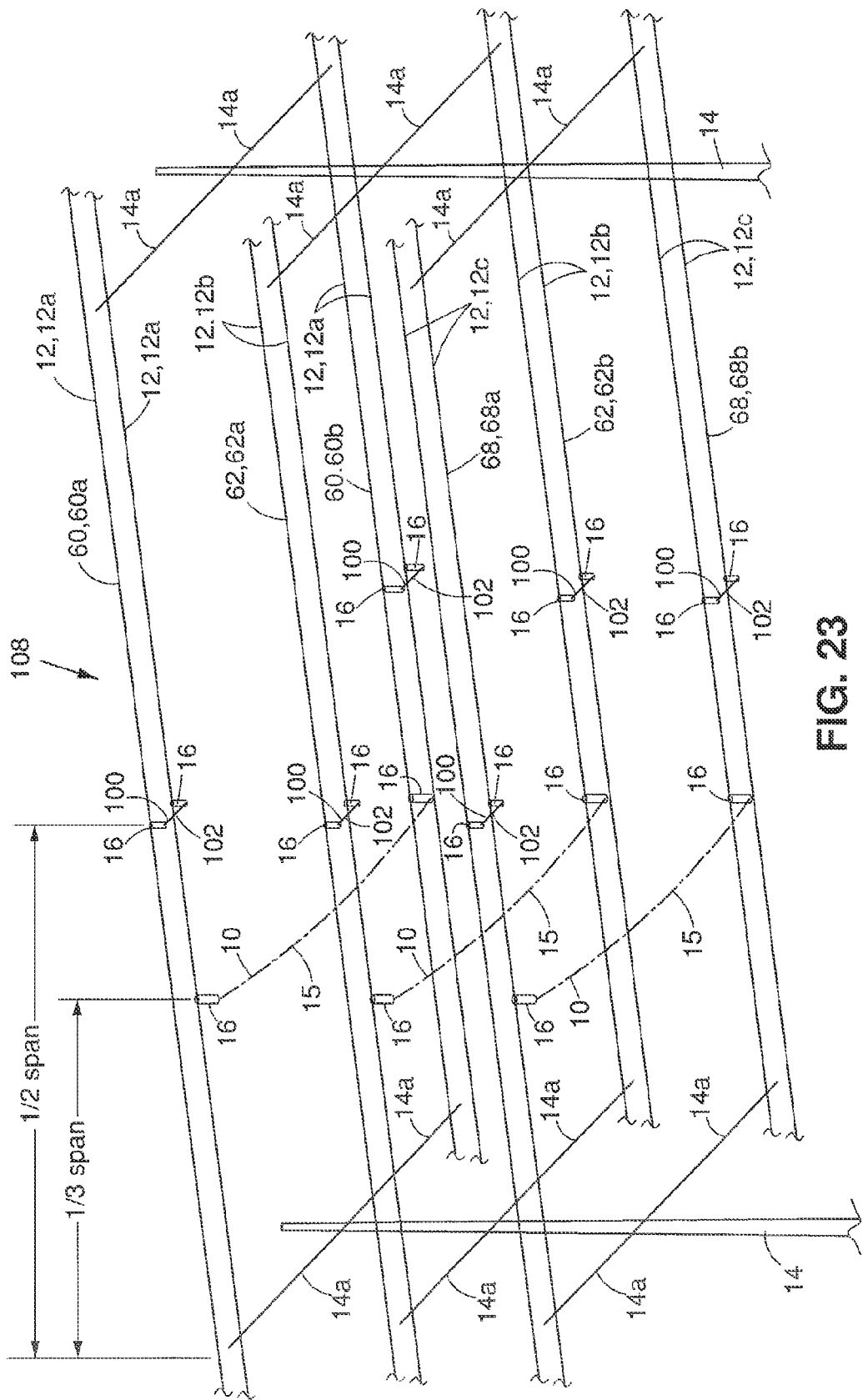
FIG. 23 is a schematic perspective view of the system or span of FIG. 22.

Referring to FIGS. 22 and 23, antigalloping system or antigalloping span 108 can have poles 14 with arms 14a on both sides for support two pairs or sets of first, top or upper twin bundles 60, 60a and 60b of cables or conductors 12a, second intermediate or middle twin bundles 62, 62a and 62b of cables or conductors 12b, and third, bottom or lower twin bundles 68, 68a and 68b of cables or conductors 12c, one on each side of the pole 14. Bundles 60a, 62a and 68a can be on one side of the pole 14, and bundles 60b, 62b and 68b can be on the other or opposite side. Each bundle pair 60a and 60b, 62a and 62b, and 68a and 68b, can be laterally coupled, connected or tied together at the ⅓ span location by an antigalloping device 10 secured to and between respective adjacent conductors 12a/12a, 12b/12b, and 12c/12c. The antigalloping devices 10 and the connecting assembly 15 can extend generally laterally or horizontally between the respective cables 12 and can have a slight generally catenary curve. At the ½ span location, each bundle 60a, 60b, 62a, 62b, 68a and 68b, can include a spacer device 100 secured generally laterally or horizontally to and between the conductors 12 in their respective bundles. As seen in FIGS. 18 and 22-24, the longitudinal axes C of the clamps 16 of devices 10 and 100 can extend downwardly along a generally vertical orientation, and can impart a pretwist on the conductors 12. The antigalloping devices 10 can reduce or dampen galloping between pairs of attached bundles 60, 62 and 68, and the spacer devices 100 can reduce or dampen galloping between conductors 12 in each bundle. The installation of the spacer devices 100 at the ½ span point location can provide or allow the snubbing or twisting action of the conductors 12 twisted by the antigalloping devices 10 to drive or rotate the clamps 16 of the spacer devices 100 through large angles when galloping occurs. This can, therefore, involve the other conductor 12 or subconductor that the spacer device 100 is connected to. The other conductor 12 or subconductor in a twin bundle 60, 62 or 68 that is not connected to an antigalloping device 10 can be twisted by the attached spacer device 100 in a similar manner as previously discussed. When one conductor 12 or subconductor in a twin bundle 60, 62 or 68 is twisted by an antigalloping device 10 at the ⅓ span location, the spacer device 100 (or its clamps 16) at the ½ span location connecting the twin bundle 60, 62 or 68 together is also twisted or rotated by the twisting conductor 12, which then twists the other conductor 12 or subconductor that the spacer device 100 is connected to at the ½ span location, almost the same amount. Analysis of the lateral displacement of the conductors 12 or subconductors can be made easily once the tension and the torsional stiffness is known. The effectiveness of the antigalloping devices 10 can be nearly doubled with the addition of spacer devices 100 when galloping occurs, since the spacer devices 100 can twist an additional conductor 12. In one embodiment, the lateral distance $S_1$ between the conductors 12 in a bundle can be about 18 inches, and the lateral distance $S_2$ between two pairs of bundles can be 20-25 feet. Vertically oriented antigalloping devices 10 are not normally required for reducing galloping in this span, but can be included if desired.

With a single antigalloping device 10 per phase secured to and between bundles 60a/60b, 62a/62b and 68a/68b, in a horizontal plane, there can be no voltage difference between the two connected conductors 12 of the phases, but at least a small insulator 38 can be included to protect against phase to ground faults. Clamps 16 that are installed with an initial angle can cause a twisting of attached conductors 12 or subconductors with any up-down gallop.

Figure 24:
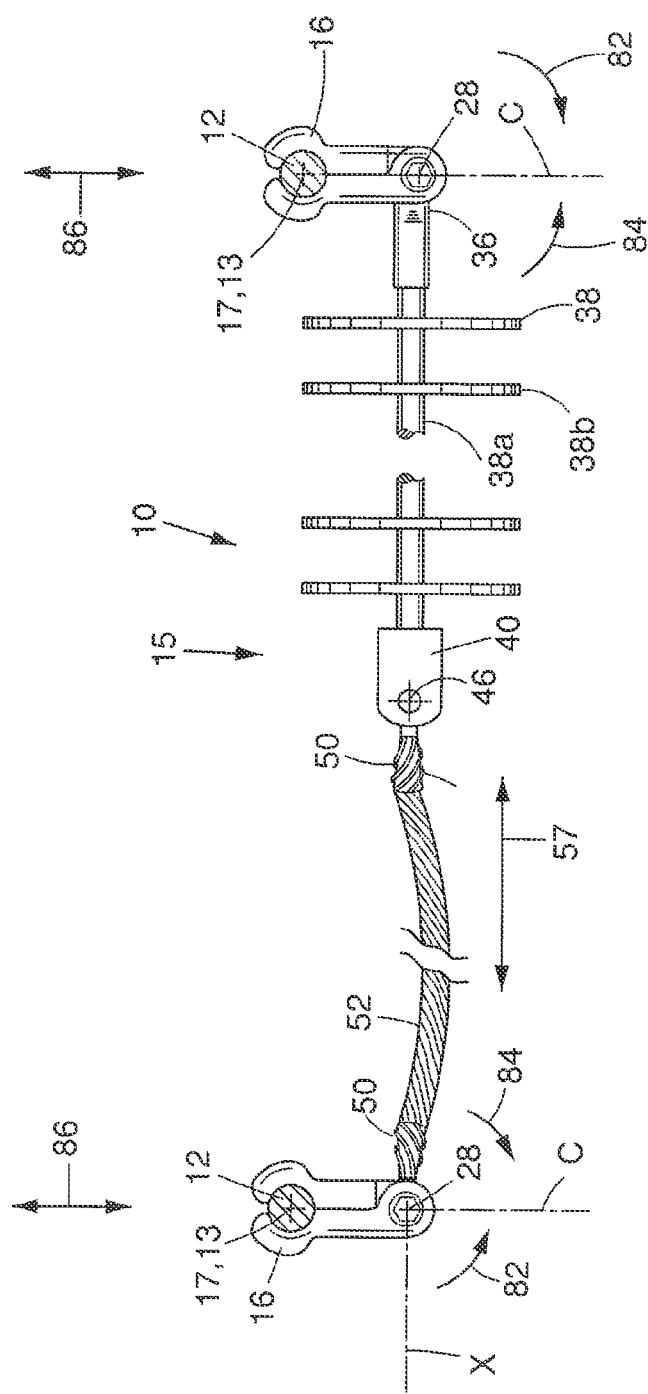
FIG. 24 is a side view of an antigalloping device attached to laterally spaced conductors or cables and positioned in a lateral or horizontal position with the clamps positioned for providing an initial cable twist.

Referring to FIG. 24 a laterally or horizontally connected antigalloping device 10 with longitudinal axes C of clamps 16 oriented generally vertically can reduce or dampen galloping between laterally spaced cables or conductors 12 when the conductors 12 move up and down relative to each other in the direction of arrows 86. Since connected adjacent conductors 12 typically do not gallop in phase, one conductor 12 can move up or down relative to the other conductor 12, thereby causing the conductors 12 to move further apart from each other. This can straighten the connecting assembly 15 along longitudinal axis X and exert an opposed tension 57 on connecting assembly 15 and cable 52, straightening and rotating the clamps 16 in the direction of arrows 82 in a manner similar to devices 10 oriented in a vertical orientation, as previously discussed. If enough movement of conductors 12 occurs, the axes C of clamps 16 can be straightened out and extend along longitudinal axis X, but often can be between a transverse position and a position inline with the longitudinal axis X, including intermediate positions therebetween. This can rotate the cables 12 in the direction of arrows 82 and orient any ice structures 70 into nonaerodynamically lifting positions to reduce lift and galloping, as previously described. The clamps 16 can be applied to exert a pretwist on the conductors 12, such as shown in FIG. 21, where the weight of the antigalloping device 10 can rotate the clamps 16 rotationally downward in the direction of arrows 84. This can provide a resilient force in the direction of arrows 82 which can help rotate the clamps 16 in the direction of arrows 82. In addition, if both conductors 12 happen to gallop upward in unison in the direction of arrows 86, at the point when the antigalloping device 10 is weightless relative conductors 12, the conductors 12 can resiliently twist in the direction of arrows 82 to reduce galloping.

Figure 25:
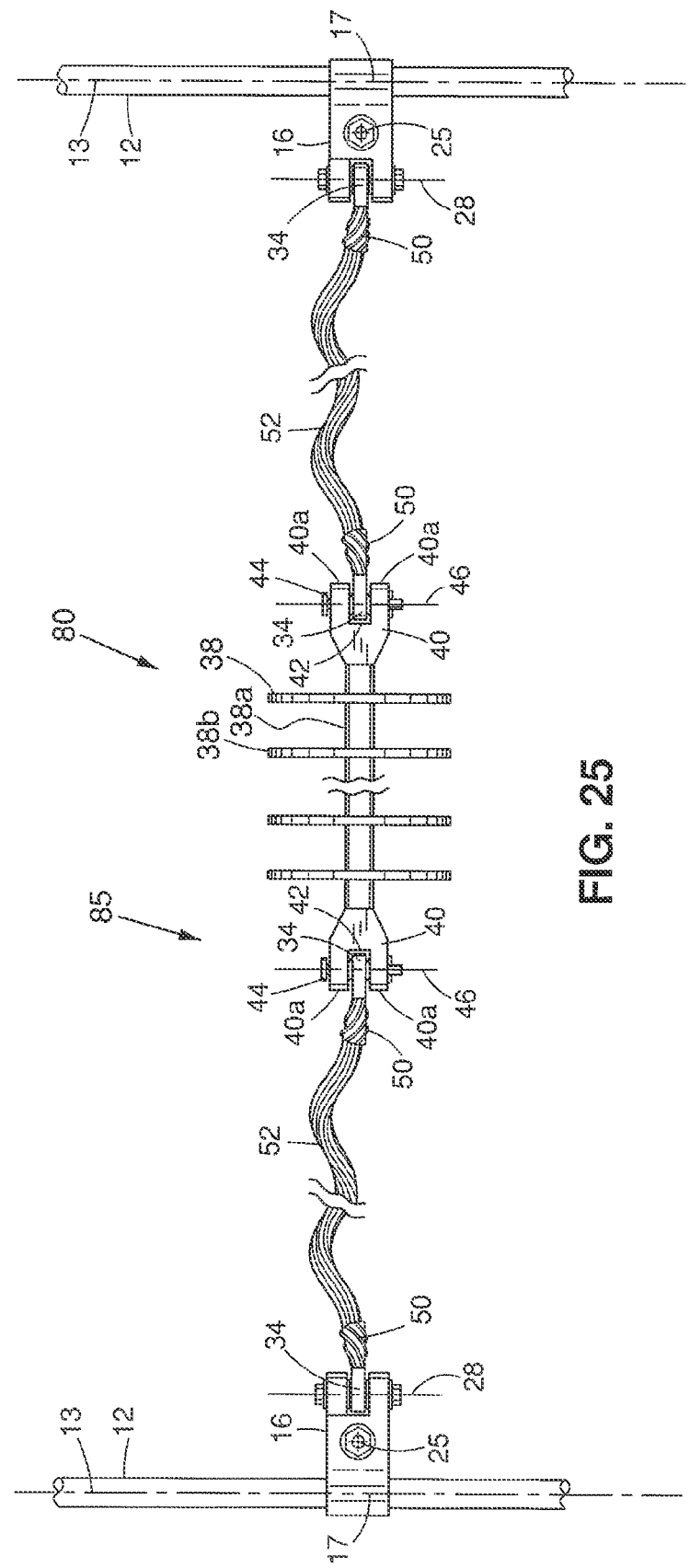
FIG. 25 is a top view of another antigalloping device in the present invention suitable for positioning in a lateral or horizontal orientation with the clamps being in an initial clamp attachment position.
Figure 26:
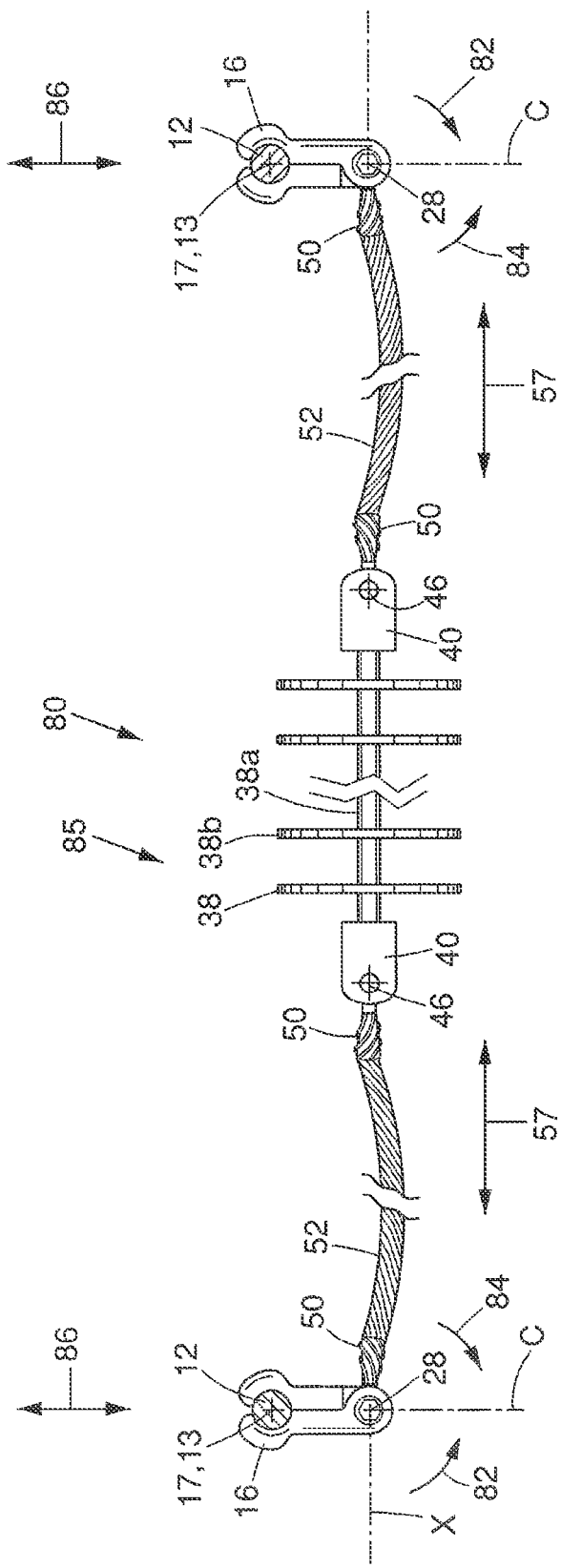
FIG. 26 is a side view of the antigalloping device of FIG. 25 positioned in a lateral or horizontal orientation with the clamps positioned for providing an initial conductor or cable twist.

Referring to FIGS. 25 and 26, antigalloping device 80 is an embodiment in the present invention which differs from antigalloping device 10 in that connecting assembly 85 can have first and second lengths of flexible cable 52 rotatably coupled to opposite ends of an elongate insulator 38. The insulator 38 can have two clevis joint members or fittings 40 at opposite ends for pivotably or rotatably coupling to respective pivot members 34 secured to cables 52, along first and second parallel connecting assembly clevis joint axes 46. Each cable 52 can be secured to the insulator 38 in a similar manner as previously described for antigalloping device 10. First and second clamps 16 can be pivotably or rotatably coupled to opposite ends of the connecting assembly 85 to respective terminal ends of the two cables 52, about respective clamp joint axes 28. Each cable 52 can have a pivot member or fitting 34 secured thereto, which is rotatably coupled to a clamp 16 in a similar manner as previously described for antigalloping device 10. Axes 17, 28 and 46 can be parallel to each other. FIG. 25 depicts antigalloping device 80 when first laterally secured between and to two laterally spaced cables or conductors 12 for providing a pretwist to the conductors 12. FIG. 26 depicts antigalloping device 80 once the weight of the antigalloping device 80 has rotated the clamps 16 downwardly in the direction of arrows 84 so that the longitudinal axes C of the clamps 16 are oriented generally vertically. The clamps 16 can hang downwardly from the conductors 12 and the connecting assembly 85 can be oriented generally laterally or horizontally in a slight generally catenary curve. Opposed tension 57 exerted on the connecting assembly 85 and cables 52 by movement of conductors 12 away from each other can tighten and straighten the cables 52 and insulator 38 along longitudinal axis X. Operation of antigalloping device 80 for reducing galloping is similar to that described above with respect to antigalloping device 10, as well as for FIG. 24, and can be substituted for antigalloping device 10.

Figure 27:
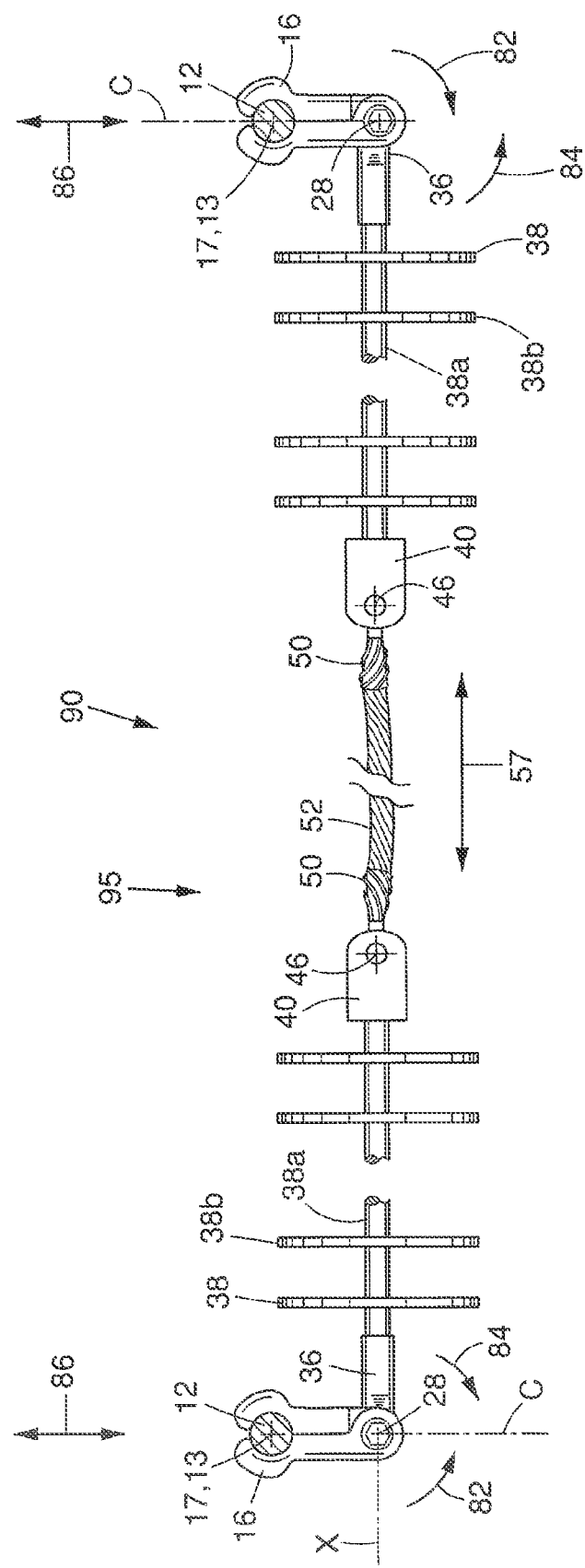
FIG. 27 is a side view of another antigalloping device in the present invention suitable for positioning in a lateral or horizontal orientation with the clamps being positioned for providing an initial conductor or cable twist.

Referring to FIG. 27, antigalloping device 90 is an embodiment in the present invention which differs from antigalloping device 10 in that connecting assembly 95 can have first and second elongate insulators 38 pivotably or rotatably coupled to opposite ends of a length of cable 52. Each insulator 38 can have a clevis joint member or fitting 40 for pivotably or rotatably coupling to pivot members 34 secured to opposite ends of the cable 52 along connecting assembly clevis joint axes 46. Each insulator 38 can be secured to the cable 52 in a similar manner as previously described for antigalloping in device 10. First and second clamps 16 can be pivotably or rotatably coupled to opposite ends of the connecting assembly 95 to respective terminal ends of the two insulators 38, about respective clamp joint axes 28. Each insulator 38 can have a pivot member or fitting 36 which is rotatably coupled to a clamp 16 in a similar manner as previously described for antigalloping device 10. Axes 17, 28 and 46 can be parallel to each other. FIG. 27 depicts antigalloping device 90 after securement to two laterally spaced conductors 12 and the weight of the antigalloping device 90 has rotated the clamps 16 downwardly in the direction of arrows 84 so that the conductors 12 have a pretwist and the longitudinal axes C of the clamps 16 are oriented generally vertically. The clamps 16 can hang vertically from the conductors 12 and the connecting assembly 95 can be oriented generally laterally or horizontally in a slight generally catenary curve. Opposed tension 57 exerted on the connecting assembly 95 and cable 52 by movement of conductors 12 away from each other can tighten and straighten the cable 52 and insulators 38 along longitudinal axis X. Operation of antigalloping device 90 for reducing galloping is similar to that described above with respect to antigalloping device 10 and for FIG. 24, and can be substituted for antigalloping devices 10 and 80. In one example, if antigalloping device 90 is used in the antigalloping system or span 108 seen in FIGS. 22 and 23, insulators 38 can be located at each end of the tether cable 52 of antigalloping device 90 and to conductors 12 nearest to the ⅓ span point location. Graded insulators 38 can be used to eliminate corona rings. Clamps 16 can be installed with an initial angle to cause twisting of the attached conductors 12 or subconductors with any up-down gallop. The insulators 38 in some embodiments of the antigalloping devices, can be 3 to 5 feet long. Antigalloping devices 80 and 90 can be used in vertical, horizontal or inclined orientations, and can replace or supplement antigalloping device 10, including in antigalloping systems or spans.

Figure 28:
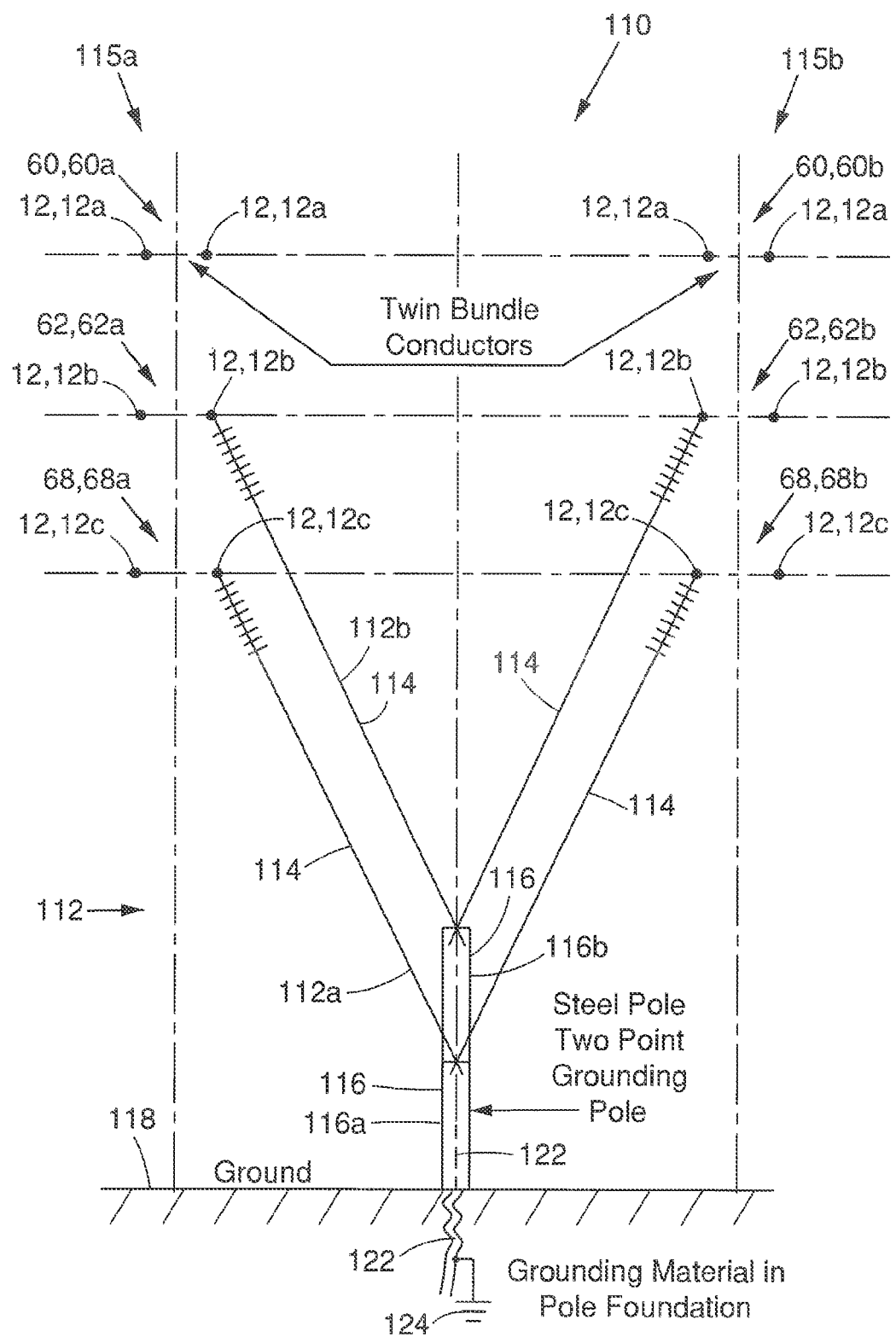
FIG. 28 is a schematic side or end view of an embodiment of another antigalloping system or antigalloping span in the present invention.
Figure 29:
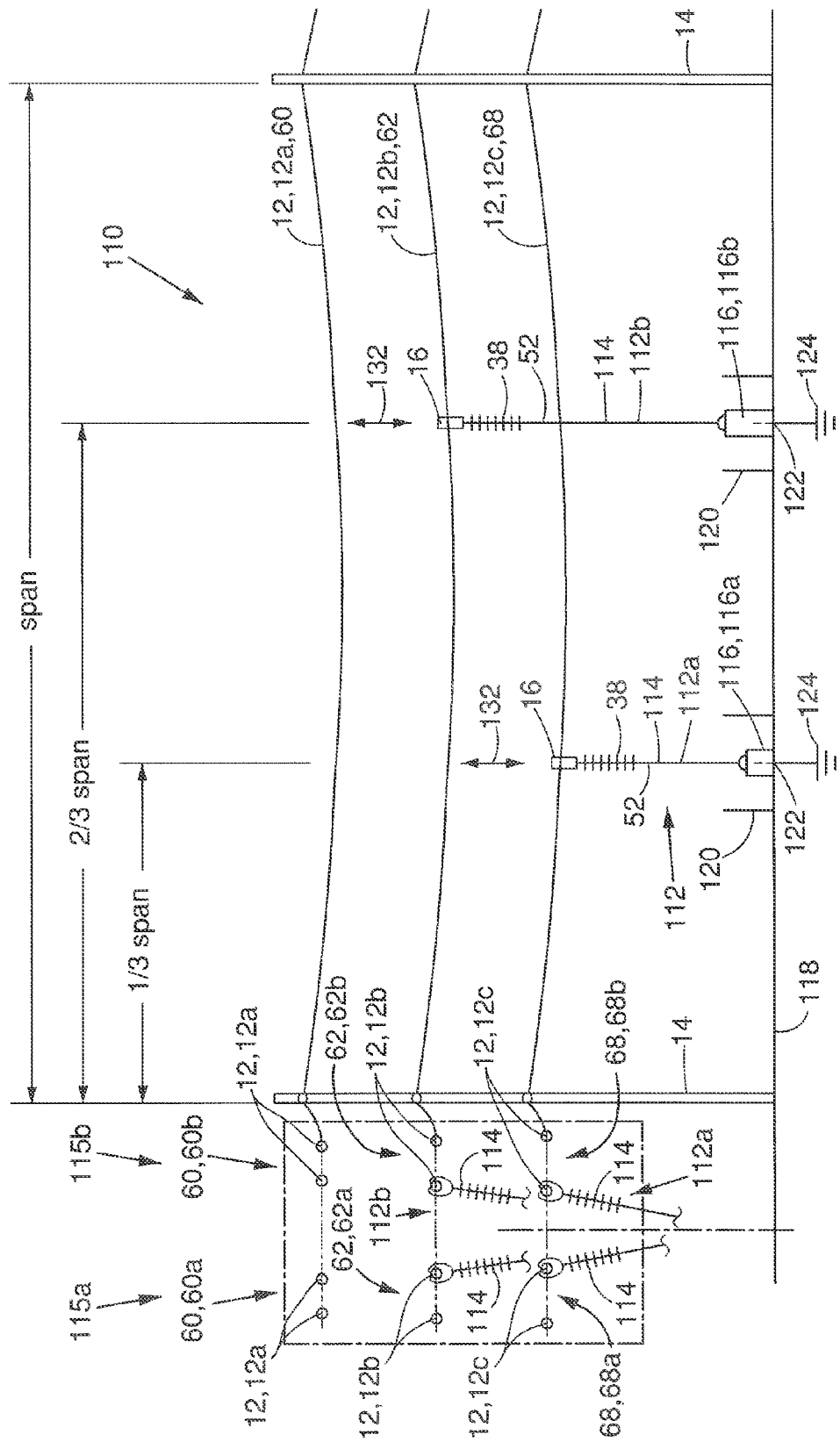
FIG. 29 is a schematic front view of the system or span of FIG. 28 including a side or end view portion.

Referring to FIGS. 28 and 29, antigalloping system or antigalloping span 110 can have laterally spaced apart first 115a and second 115b circuits, having respective first, top or upper phase twin bundles 60, 60a and 60b of lines, cables, or conductors 12 and 12a, second, intermediate or middle phase twin bundles 62, 62a and 62b of lines, cables or conductors 12 and 12b, and third, bottom or lower phase twin bundles 68, 68a, and 68b of lines, cables or conductors 12 and 12c, which in some embodiments, can be of similar arrangement to that seen in FIGS. 22 and 23. The antigalloping span 110 can include an antigalloping system, arrangement or assembly 112 that can be simpler and/or less expensive than systems that require connections between phases.

The antigalloping system 112 can include first 112a and second 112b antigalloping devices secured to the lower 68 and middle 62 bundles of conductors 12 and to the ground 118 at respective ⅓ span and ⅔ span distances. The first antigalloping device 112a can be a twin antigalloping device having two antigalloping subassemblies or units 114 secured to an anchor member 116, which can be a first anchor member 116a, at the ⅓ span location, and to the two inner or adjacent lower conductors 12c of the two lower bundles 68a and 68b of the spaced apart first 115a and second 115b circuits. The two antigalloping units 114 of the first antigalloping device 112a can angle downwardly from bundles 68a and 68b towards the ground 118 to the center or center line 122, and towards each other, for securement to the anchor member 116, such as in a Vee configuration. The second antigalloping device 112b can be a twin antigalloping device having two antigalloping subassemblies or units 114 secured to an anchor member 116, which can be a second anchor member 116b, at the ⅔ span location, and to the two inner or adjacent middle conductors 12b of the two middle bundles 62a and 62b of the spaced apart first 115a and second 115b circuits. The two antigalloping units 114 of the second antigalloping device 112b can angle downwardly from bundles 62a and 62b towards the ground 118 to the center 122, and towards each other, for securement to the anchor member 116, such as in a Vee configuration. Each anchor member 116 or anchor members 116a and 116b, can be surrounded by or enclosed within an enclosure 120, such as a wall or fence to prevent unauthorized access to the antigalloping system 112 around the anchor member 116 or anchor members 116a and 116b. The two upper bundles 60a and 60b can remain free of connections to antigalloping system 112.

Figure 30:
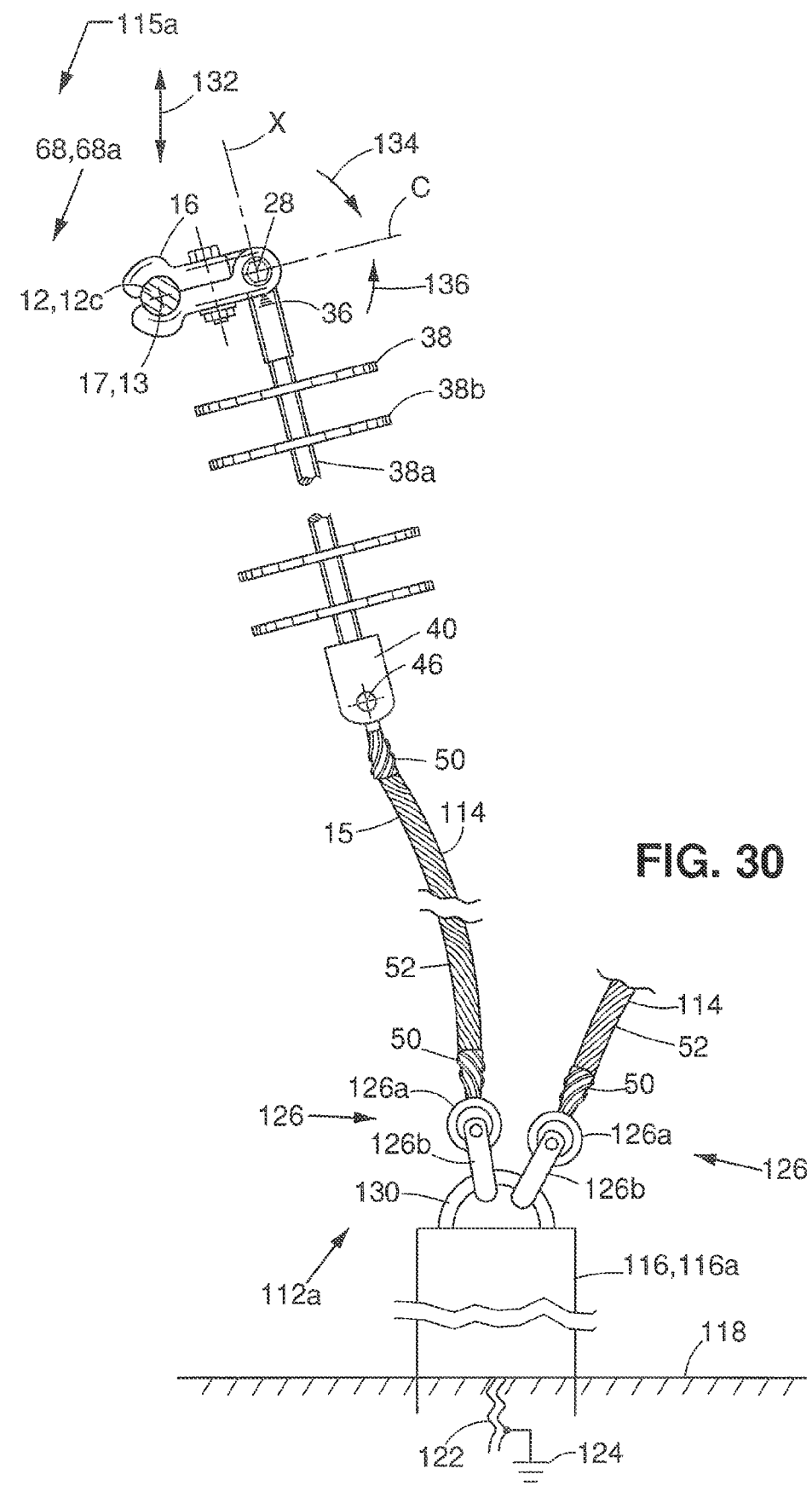
FIGS. 30 and 31 are side views of an embodiment of an antigalloping device in the present invention.
Figure 31:
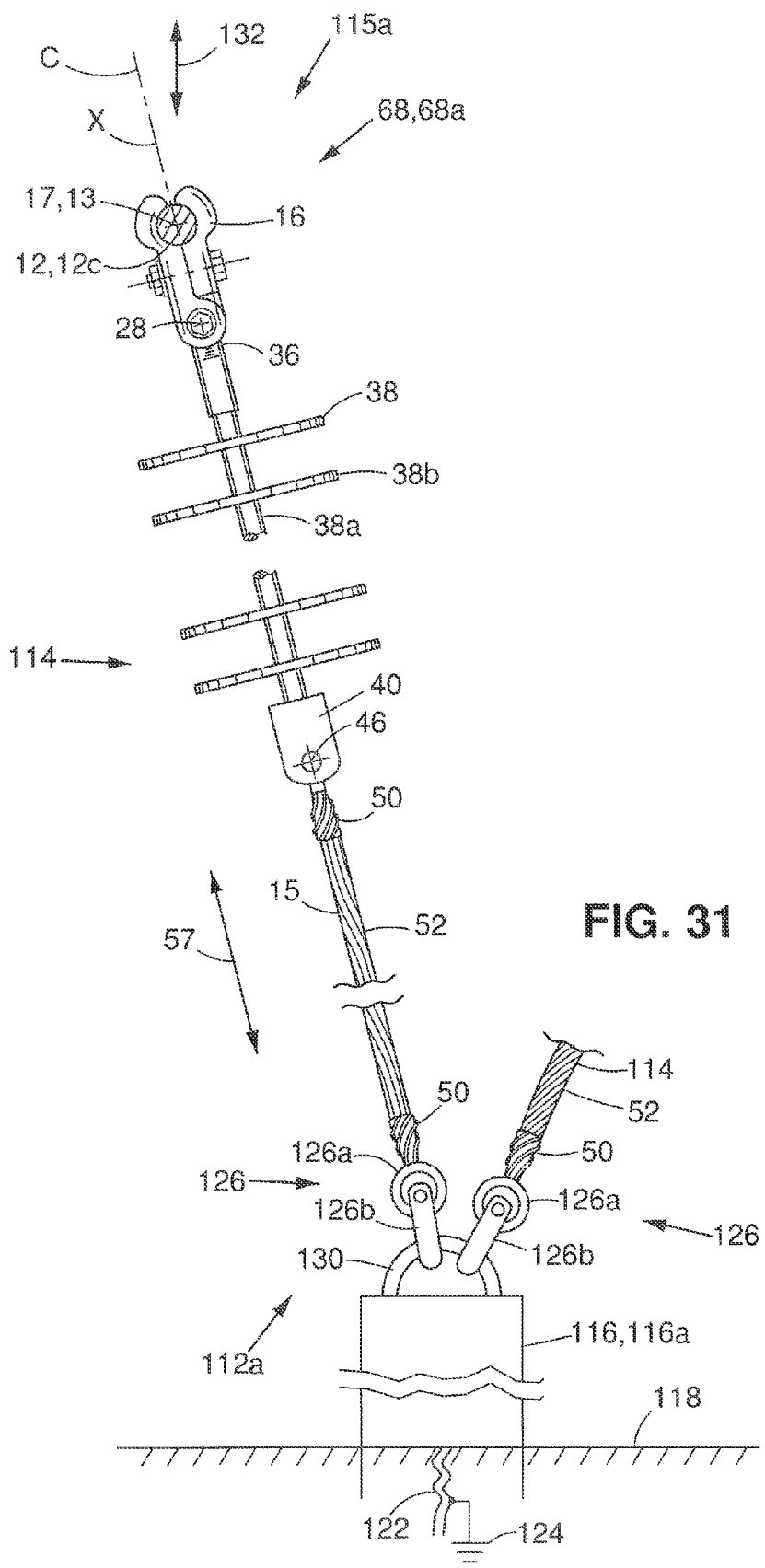

Referring to FIGS. 30 and 31, the first antigalloping device 112a is described, with the understanding that the second antigalloping device 112b can have similar construction. Antigalloping device 112a can have an elongate partially flexible restraining or connecting assembly 15 that is similar to the connecting assembly in antigalloping device 10, and can include an elongate electrical insulator or portion 38 which can be rigid and at an upper portion, rotatably attached to a flexible tether or cable 52 about axis 46, which can be at a lower portion. The cable 52 can be steel cable and can be generally unstretchable once straightened out along the longitudinal axis X of the insulator 38. A first securement fitting, such as a clamp 16 similar to that in antigalloping device 10, can be rotatably secured to one end or the upper end of connecting assembly 15 and insulator 38, about axis 28. The clamp 16 can be clamped to a conductor 12, such as an inner conductor 12c in the bundle 68a of the first circuit 115a, for securing the upper portion of the antigalloping device 112a and unit 114 to conductor 12c. The lower portion of the connecting assembly 15 and cable 52 can be connected to a second securement fitting 126, for securing the lower portion of the connecting assembly 15 and unit 114 to an anchor member 116. The securement fitting 126 can have a ring member 126a secured to the lower portion of cable 52 on the opposite end of the connecting assembly 15 from clamp 16, and an openable ring member or shackle 126b securing the ring member 126a to an anchor attachment point or ring member 130 for securing unit 114 to the anchor member 116 and to the ground 118. The ring members 126a, 126b and 130 can be shaped, configured and positioned to allow multi axis movement, including pivoting and sliding of the lower portion of connecting assembly 15 relative to the anchor member 116 to adjust to motions or movement of the unit 114. In some embodiments, the ring member 126a can be configured for securing to anchor member 116, and ring member 126b can be omitted. The anchor member 116 can be physically secured to, embedded, or buried into the ground 118, and can include grounding material or wires 122 electrically connecting the ring member 130 and/or anchor member 116 to electrical ground 124, for electrically grounding the anchor member 116 and the antigalloping device 112a. In some embodiments, the anchor member 116 can be a steel grounding pole secured to the ground 118. In other embodiments, the anchor member 116 can be a concrete pillar or block with grounding material 122 extending into the ground 118. It is understood that securement fitting 126 can have other suitable configurations and connections to anchor 116 as known in the art.

The first antigalloping device 112a can include a second antigalloping unit 114 of similar construction, that can be secured to an anchor member 116, and to a conductor 12, such as an inner or adjacent conductor 12c of bundle 68b in the second circuit 115b, in a similar manner as described with respect to bundle 68a. The securement fittings 126 of the two antigalloping units 114 can be attached to the same ring member 130 of the anchor 116 adjacent to each other, and form a generally Vee shape configuration relative to each other extending upwardly from the anchor member 116.

The second antigalloping device 112b at the ⅔ span distance can have a similar construction as the first antigalloping device 112a, but can have a longer connecting assembly 15 and cable 52, and can be secured to the inner conductors 12b in the middle bundles 62a and 62b. Although, FIG. 29 shows two anchor members 116a and 116b, at the ⅓ and ⅔ span locations, in some embodiments, a single anchor member 116 can be positioned for example at the ½ span location, for attachment to all the antigalloping units 114 of the first 112a and second 112b antigalloping devices. In other embodiments, each antigalloping unit 114 can have its own anchor member 116 which can be positioned vertically below the respective attached clamps 16, so that the antigalloping units 114 can be generally vertically oriented rather than being angled.

In operation, when antigalloping span 110 is subjected to wind, the antigalloping system 112 can prevent or reduce galloping of desired conductors 12 to prevent damage to the conductors 12 and towers or poles 14. The first antigalloping device 112a secured to the inner or adjacent lower conductors 12c of the two lower twin bundles 68a and 68b at the ⅓ span location can prevent or reduce galloping of the two attached inner lower conductors 12c. The second antigalloping device 112b secured to the inner or adjacent middle conductors 12b of the two middle twin bundles 62a and 62b at the ⅔ span location can prevent or reduce galloping of the two attached inner middle conductors 12b. In each of the middle 62a and 62b and lower 68a and 68b twin bundles, only one of the conductors 12 in a bundle 62 and 68 is secured to the antigalloping devices 112a and 112b. Reducing or preventing galloping in only one of the two conductors 12 in each twin bundle 62 and 68 is sufficient to prevent excessive galloping, clashing and damage of the middle 12b and lower 12c conductors with each other, with poles 14 and with the unrestricted upper conductors 12a of the upper twin bundles 60a and 60b. Referring to FIGS. 29-31, when an attached conductor 12 of an antigalloping unit 114 gallops up and down in the direction of arrows 132, the movement of the conductor 12 alternately cyclically tightens the attached clamp 16, and insulator 38 and cable 52 of connecting assembly 15 along longitudinal axis X under opposed tension indicated by arrows 57, and relaxes or collapses the clamp 16 and the connecting assembly 15 when tension 57 is released or lessened. This can cyclically rotate the clamp 16 attached to the conductor 12 about axis 28 in the direction of arrows 134 and 136, between a position where axis C of the clamp 16 is transverse to longitudinal axis X, and a position inline with longitudinal axis X, thereby twisting the attached conductor 12, and reducing aerodynamic lift and galloping, such as previously discussed. The pulling and relaxing of the attached clamp 16, connecting assembly 15 and antigalloping unit 114 by the conductor 12 is caused by the up and down movement of the conductor 12, since the other end of the antigalloping unit 114 is secured or anchored to the ground 118 by anchor member 116.

Since there are no structures or conductors above the upper conductors 12a, an antigalloping device does not need to be secured to the upper twin bundles 60. As a result, the upper conductors 12a are allowed to gallop, and their maximum downward motion is limited to 40% of sag. By securing an antigalloping device to only one conductor 12 in each twin middle 62 and lower 68 bundle and to an anchor member 116 on the ground 18, and not securing any antigalloping devices to the upper conductors 12a, a minimal amount of antigalloping devices, equipment and components can be employed for reducing galloping, for example, as compared with the antigalloping span 108 in FIG. 23. This can greatly reduce the cost for antigalloping span 110, which can use at least ⅓ less antigalloping units 114. Further cost is reduced by having the antigalloping devices 112a and 112b securing between the conductors 12 and the ground 118, rather than between phases or bundles. In one example, for a 345 kV line voltage, an insulator connected between two phases in prior systems must be configured to withstand a voltage difference of more than 1050 kV, while in the present invention for the same line voltage, the insulators 38 of antigalloping devices 112a and 112b connected between conductors 12b and 12c and the ground 118, need only be configured to withstand a voltage difference of less than 500 kV, which is a much lower voltage. Consequently, the insulators 38 in antigalloping system 112 can be about 50% smaller or shorter in length or size, and in weight and cost. For voltage differences of over 1000 kV, insulators 15-20 ft. long may be required, while an insulator for 500 kV can be about 7 to 10 feet long, and can provide a substantial savings in cost. In some embodiments, the difference in length can be a factor of about 1.7 smaller. Additional cost savings can be achieved by having only one clamp 116 for each antigalloping until 114, and corona rings are not required at the anchor member 116 location.

In some embodiments, the anchor member or members 116 can be steel poles extending from the ground 118 anywhere from ground level to about 20 ft. high. The cable 52 in the connecting assembly 15 can be ¼ inch diameter steel cable, and can have a length dependent upon the location of the conductor 12 attached to, and the height and location of the associated anchor member 116. In some embodiments, the vertical spacing between the upper 60, middle 62 and lower 68 phase bundles can be about 25 feet, and the lateral spacing between the laterally adjacent bundles 60, 62, and 68 in the first 115a and second 115b circuits can range from about 27 to 35 feet. Although the antigalloping system 112 is shown connected to the inner or adjacent conductors 12 of two adjacent spaced apart twin bundles 62 and 68, securement can also be made to one or both outer conductors 12. In addition, the antigalloping system 112 or units 114 can be attached to single conductors or single conductor bundles, or to bundles containing more than two conductors, such as in triple bundles. In some embodiments, if desired, antigalloping units 114 can be secured to the upper bundles 60, and/or antigalloping devices can be connected between phases. In some embodiments, antigalloping units 114 can include other suitable connecting assemblies, which can include the connecting assemblies 85 and 95 shown in FIGS. 25-27.

While this invention has been particularly shown and described with references to example embodiments thereof; it will be understood by those skilled in the art that various changes in form and details may be made therein without departing from the scope of the invention encompassed by the appended claims.

For example, although various dimensions have been provided, it is apparent that dimensions and sizes can vary, depending upon the situation at hand. In some embodiments that show the upper clamp 16a positioned vertically, the upper clamp 16a can be also positioned in a horizontal orientation for twisting conductors at both ends of device 10. Flexible cable 52 can be replaced with flexible rope, synthetic or natural materials, or chain. Although a particular clamp 16 has been shown, other suitable clamps can be used. The connecting assembly 15 can be positioned with the insulator 38 at the bottom and the flexible cable 52 at the top. In some cases, pivots at axes 28 and/or 46 can be omitted, and the flexibility of cable 52 being used to provide the ability for lower clamp 16b to rotate. In some embodiments, the insulator 38 can have flexibility. If a span contains more than three spaced conductors or bundles, additional antigalloping devices can be secured. The number and configuration of conductors in a bundle can vary as desired. Although the present invention has been shown for electrical transmission spans, in other embodiments, the present invention can be used for preventing or reducing galloping in cables in other fields, such as cables supporting structures, including towers. In addition, directional terms, including terms such as upper, lower, top, bottom, horizontal or vertical have been used to describe the antigalloping devices, systems or spans when oriented in place on a certain span of cables or conductors, and it is understood that the antigalloping devices and cables can be positioned in other orientations. Also, it is understood that dimensions can vary, depending upon the situation at hand. The ⅓, ½ and ⅔ span locations or distances, can be approximate locations, and do not have to be numerically exact.

What is claimed is:

1. An antigalloping electrical conductor span comprising:
at least one generally laterally extending electrical conductor in a span comprising a first circuit having bundles of upper, middle and lower electrical conductors, and a second circuit laterally spaced apart from the first circuit having bundles of upper, middle and lower electrical conductors, each bundle comprising at least two electrical conductors; and
an antigalloping system comprising at least one antigalloping device, the at least one antigalloping device comprising a connecting assembly having an electrically insulated portion and a flexible tether, the flexible tether capable of being bent and maneuvered during installation, a clamp rotatably coupled to a first end of the connecting assembly having a jaw clamping to said at least one electrical conductor, a securement fitting extending from a second end of the connecting assembly that is secured to an anchor member that is secured and electrically grounded to ground for anchoring the second end of the connecting assembly to the ground, the connecting assembly capable of straightening along a longitudinal axis under tension, and the clamp being orientatable in a position transverse to the longitudinal axis for being rotatable between the position transverse to the longitudinal axis and a position inline with the longitudinal axis under up/down movement of the at least one electrical conductor, for twisting the at least one electrical conductor for reducing galloping, the at least one antigalloping device comprises a first antigalloping device secured to one of the electrical conductors in one bundle of one of the middle and lower conductors at a ⅓ span distance, and the system further comprising a second antigalloping device secured to one of the electrical conductors in one bundle of the other of the middle and lower conductors at a ⅔ span distance, for reducing galloping in the span of conductors, the first antigalloping device having twin antigalloping units secured to at least one anchor member and to one conductor in respective bundles in both the first and second circuits at the ⅓ span distance, and the second antigalloping device having twin antigalloping units secured to said at least one anchor member and to one conductor in respective bundles in both the first and second circuits at the ⅔ span distance.

2. The span of claim 1 in which the securement fitting comprises a ring member for securing to the anchor member.

3. The span of claim 1 in which the flexible tether comprises flexible steel cable.

4. The span of claim 3 in which the electrically insulated portion and the flexible cable are rotatably coupled together about a connecting assembly joint axis.

5. The span of claim 1 in which the clamp is rotatably coupled to the connecting assembly about a clamp joint axis.

6. A method of reducing galloping in a span of at least one generally laterally extending electrical conductor comprising:
    securing at least one antigalloping device of an antigalloping system to the at least one electrical conductor, the at least one antigalloping device comprising a connecting assembly having an electrically insulated portion and a flexible tether, the flexible tether capable of being bent and maneuvered during installation, a clamp being rotatably coupled to a first end of the connecting assembly having a jaw clamping to said at least one electrical conductor, a securement fitting extending from a second end of the connecting assembly securing the second end of the connecting assembly to an anchor member that is secured and electrically grounded to ground;
    orienting the clamp in a position transverse to a longitudinal axis of the connecting assembly;
    straightening the connector assembly along the longitudinal axis and rotating the clamp between the position transverse to the longitudinal axis and a position inline with the longitudinal axis under up/down movement of the at least one electrical conductor, for twisting the at least one electrical conductor for reducing galloping; the span of at least one generally laterally extending electrical conductor comprising a first circuit having bundles of upper, middle and lower electrical conductors, and a second circuit laterally spaced apart from the first circuit having bundles of upper, middle and lower electrical conductors, each bundle comprising at least two electrical conductors, the at least one antigalloping device comprises a first antigalloping device, the method further comprising:
    securing the first antigalloping device to one of the electrical conductors in one bundle of one of the middle and lower conductors at a ⅓ span distance;
    securing a second antigalloping device of the system to one of the electrical conductors in one bundle of the other of the middle and lower conductors at a ⅔ span distance, for reducing galloping in the span of conductors;
    configuring the first antigalloping device with twin antigalloping units secured to at least one anchor member and to one conductor in respective bundles in both the first and second circuits at the ⅓ span distance; and
    configuring the second antigalloping device with twin antigalloping units secured to said at least one anchor member and to one conductor in respective bundles in both the first and second circuits at the ⅔ span distance.

7. The method of claim 6 further comprising providing a ring member as the second securement fitting for securing to the anchor member.

8. The method of claim 6 further comprising providing flexible steel cable as the flexible tether.

9. The method of claim 8 further comprising rotatably coupling the electrically insulated portion and the flexible cable together about a connecting assembly joint axis.

10. The method of claim 6 further comprising rotatably coupling the clamp to the connecting assembly about a clamp joint axis.

* * * * *

UNITED STATES PATENT AND TRADEMARK OFFICE
CERTIFICATE OF CORRECTION

PATENT NO. : 9,620,947 B2  
APPLICATION NO. : 14/191990  
DATED : April 11, 2017  
INVENTOR(S) : Albert S. Richardson, Jr.

Page 1 of 1

It is certified that error appears in the above-identified patent and that said Letters Patent is hereby corrected as shown below:

In the Claims

In Claim 7, Column 30, Line 25, delete "second"

Signed and Sealed this  
Sixth Day of June, 2017

Michelle K. Lee  
*Director of the United States Patent and Trademark Office*